(12) United States Patent
Oyanagi et al.

(10) Patent No.: US 7,907,315 B2
(45) Date of Patent: Mar. 15, 2011

(54) PRINT CONTROL APPARATUS AND PRINT CONTROL METHOD

(75) Inventors: Makoto Oyanagi, Matsumoto (JP); Kanako Ide, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 620 days.

(21) Appl. No.: 11/899,480

(22) Filed: Sep. 6, 2007

(65) Prior Publication Data

US 2008/0068629 A1    Mar. 20, 2008

(30) Foreign Application Priority Data

Sep. 7, 2006 (JP) ................................. 2006-242714
Sep. 8, 2006 (JP) ................................. 2006-243616

(51) Int. Cl.
*G03F 3/10* (2006.01)
*G06K 15/10* (2006.01)
*G06K 9/00* (2006.01)
*H04N 1/46* (2006.01)

(52) U.S. Cl. ........ 358/527; 358/1.15; 358/530; 358/537; 382/167

(58) Field of Classification Search ........................ None
See application file for complete search history.

(56) References Cited

U.S. PATENT DOCUMENTS

| 6,836,565 | B1 | 12/2004 | Nishikawa |
| 7,324,749 | B2 | 1/2008 | Kubo |
| 2001/0043358 | A1* | 11/2001 | Schwartz .................... 358/1.15 |
| 2003/0156196 | A1 | 8/2003 | Kato et al. |
| 2004/0090534 | A1 | 5/2004 | Nakami et al. |
| 2004/0233301 | A1 | 11/2004 | Nakata et al. |
| 2006/0008173 | A1 | 1/2006 | Matsugu et al. |
| 2006/0093212 | A1* | 5/2006 | Steinberg et al. ............ 382/167 |
| 2006/0290960 | A1 | 12/2006 | Matsuhira |
| 2007/0139741 | A1* | 6/2007 | Takami et al. ................ 358/527 |

FOREIGN PATENT DOCUMENTS

| JP | 2000-165647 A | 6/2000 |
| JP | 2004280167 A | 10/2004 |
| JP | 2005111945 A | 4/2005 |
| JP | 2005169650 A | 6/2005 |
| JP | 2005287015 A | 10/2005 |

OTHER PUBLICATIONS

Office Action issued Aug. 19, 2010 in U.S. Appl. No. 11/655,568.

* cited by examiner

*Primary Examiner* — Twyler L Haskins
*Assistant Examiner* — Barbara D Reinier

(57) ABSTRACT

In a print control apparatus of the invention, it is assumed that preprocessing with regard to a print object image specified as an object of image processing is currently being performed by an advanced processing execution module, at an input timing of an image processing instruction in response to a print instruction. On condition that a processing amount of the preprocessing currently performed by the advanced processing execution module has reached a predetermined level, an image processor waits for completion of the preprocessing performed by the advanced processing execution module and implements a correction process by utilizing a result of the preprocessing performed by the advanced processing execution module. On condition that the processing amount of the preprocessing currently performed by the advanced processing execution module has not yet reached the predetermined level, on the other hand, the image processor stops the preprocessing currently performed by the advanced processing execution module, performs the preprocessing with regard to the print object image as the object of image processing at a higher speed than a processing speed by the advanced processing execution module, and utilizes a result of the preprocessing to implement the correction process. This arrangement of the invention effectively shortens the time period elapsed before start of image processing required for printing the print object image.

7 Claims, 15 Drawing Sheets

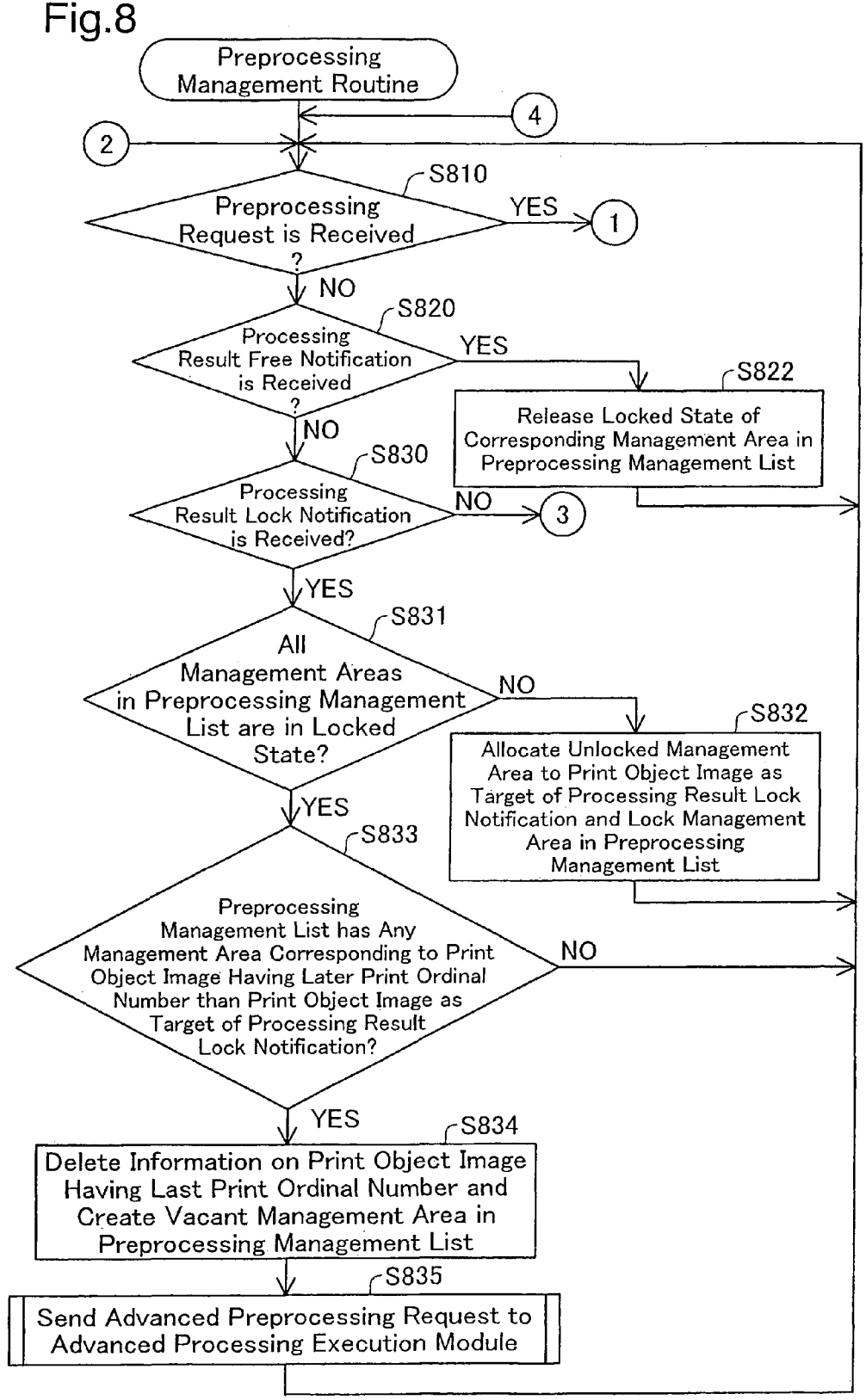

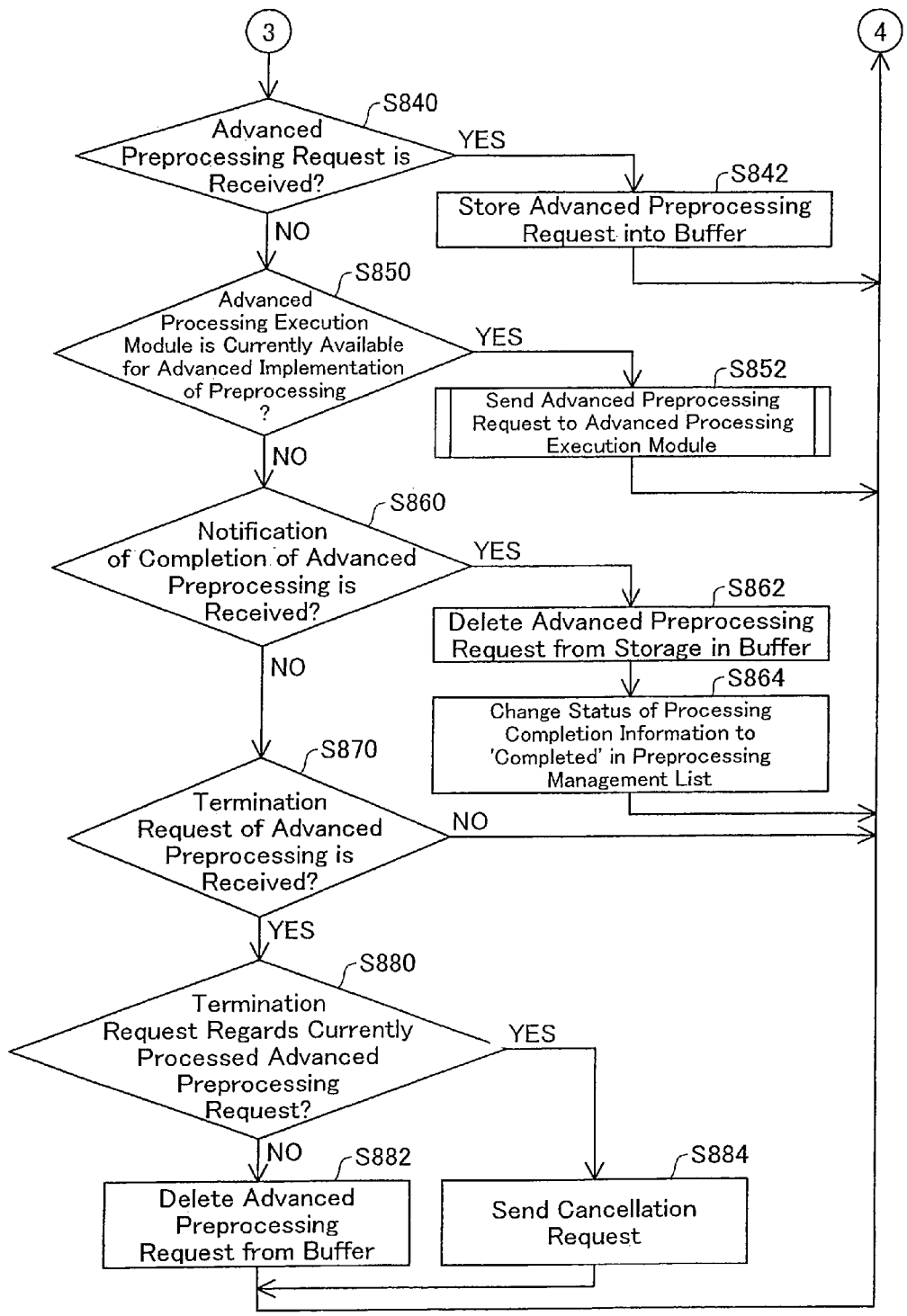

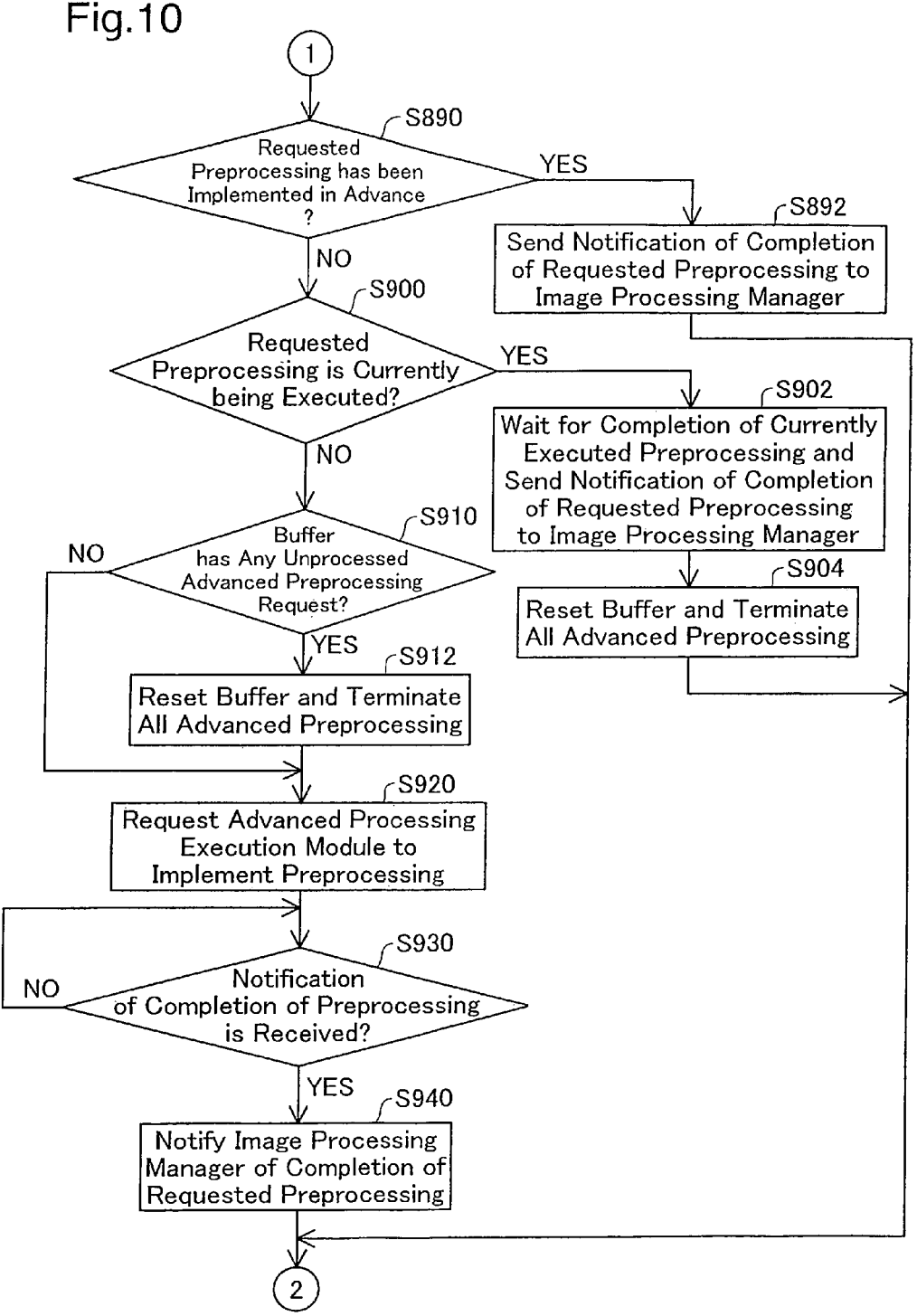

Fig.11

Preprocessing Management List

| Processing Result Storage Area | Image File Name | Processing Result Lock Information | Processing Completion Information | |
|---|---|---|---|---|
| 1 | A | Locked | Completed | |
| 2 | C | Locked | Completed | |
| 3 | E | Locked | Completed | Management Area |
| 4 | D | Locked | Completed | |

Print Object Image B: (< E) → Create Vacant Management Area, Send Advanced Preprocessing Request Print Object Image F: (> E) → Not Send Advanced Preprocessing Request Preprocessing Management List

| Processing Result Storage Area | Image File Name | Processing Result Lock Information | Processing Completion Information | |
|---|---|---|---|---|
| 1 | A | Locked | Completed | |
| 2 | C | Locked | Completed | Vacant Management Area |
| 3 | | | | |
| 4 | D | Locked | Completed | |

Preprocessing Management List

| Processing Result Storage Area | Image File Name | Processing Result Lock Information | Processing Completion Information | |
|---|---|---|---|---|
| 1 | A | Locked | Completed | |
| 2 | C | Locked | Completed | Allocation of Management Area |
| 3 | B | Locked | | |
| 4 | D | Locked | Completed | |

PRINT CONTROL APPARATUS AND PRINT CONTROL METHOD

BACKGROUND OF THE INVENTION

1. Field of the Invention

The present invention relates to a series of image processing performed to print images taken with imaging devices, such as digital cameras.

2. Description of the Related Art

Printers commonly used in the field are capable of directly reading image data, which have been taken with an imaging device, such as a digital camera, and have been stored in a storage medium like a memory card, without a personal computer and printing images represented by the read image data. These common printers are also capable of directly reading image data from the imaging device, such as the digital camera, and printing images represented by the read image data. In the description below, the images taken with such an imaging device are referred to as 'photo images', and image data representing the photo images are referred to as 'photo image data'. The printer that is capable of printing the photo images is called the 'photo printer'. The mode of directly reading image data stored in the storage medium without the personal computer and printing images represented by the read image data is referred to as the 'card print' mode.

The photo printer performs various image correction operations of the read photo image data as part of image processing required to ensure an adequate printing result of the photo image. The proposed image correction technique for correcting the photo image data is disclosed in, for example, Japanese Patent Laid-Open Gazette No. 2001-165647.

The photo printer requires preprocessing for the image correction. A typical procedure of preprocessing reads photo image data, samples pixel data from the read photo image data at a predetermined proportion to create a histogram, and performs a statistical process according to the created histogram to specify characteristic amounts representing the characteristics of the photo image and accordingly set correction parameters required for the image correction. The photo printer corrects the photo image data with the set correction parameters in the course of image processing executed for printing the photo image. The procedure of preprocessing may also perform a face recognition process to recognize the presence of any human face in the photo image and set the correction parameters required for the image correction. The procedure of preprocessing may further perform a red-eye reduction process to reduce the red-eye of the human face included in the photo image and set the correction parameters required for the image correction.

Such preprocessing is required for setting the correction parameters, prior to the required image correction and other required series of image processing for printing each photo image. When the user specifies a desired photo image for printing and gives a print start command, a certain time period is required for execution of the preprocessing before the actual start of the image processing of photo image data representing the specified photo image. Namely there is a relatively long wait time before start of the actual printing operation.

The photo image data are generally compressed in a specific compression format, for example, in a JPEG (Joint Photographic Coding Experts Group) format. Expansion of the photo image data compressed in the JPEG format is required before execution of the required image processing or the required preprocessing. This further extends the total wait time.

SUMMARY OF THE INVENTION

For solving the problem of the prior art described above, there is a need of providing a technique of shortening a time period elapsed before start of required image processing for printing a print object image specified as a desired printing object and thereby shortening a wait time before start of the actual printing operation.

In order to satisfy at least part of the above and the other related demands, one application of the present invention is directed to a print control apparatus that performs preprocessing and image processing with regard to a print object image specified as a target of a print start command, where the preprocessing specifies a correction parameter used for correcting picture quality of the print object image, and the image processing includes a correction process of print object image data representing the print object image based on the correction parameter specified in the preprocessing and is required for printing the print object image.

The print control apparatus includes: an advanced processing execution module that performs the preprocessing in advance prior to input of a print instruction for a start of printing; and an image processor that executes the image processing in response to the print instruction.

It is assumed that preprocessing with regard to a print object image specified as an object of image processing is currently being performed by an advanced processing execution module, at an input timing of an image processing instruction in response to a print instruction. On condition that a processing amount of the preprocessing currently performed by the advanced processing execution module has reached a predetermined level, an image processor waits for completion of the preprocessing performed by the advanced processing execution module and implements a correction process by utilizing a result of the preprocessing performed by the advanced processing execution module. On condition that the processing amount of the preprocessing currently performed by the advanced processing execution module has not yet reached the predetermined level, the image processor stops the preprocessing currently performed by the advanced processing execution module, performs the preprocessing with regard to the print object image as the object of image processing at a higher speed than a processing speed by the advanced processing execution module, and utilizes a result of the preprocessing to implement the correction process.

In the print control apparatus of the invention, when the processing amount of the preprocessing currently performed by the advanced processing execution module has reached the predetermined level, the image processor waits for completion of the preprocessing performed by the advanced processing execution module and implements the correction process included in the image processing by utilizing the result of the preprocessing performed by the advanced processing execution module. When the processing amount of the preprocessing currently performed by the advanced processing execution module has not yet reached the predetermined level, on the other hand, the image processor stops the preprocessing currently performed by the advanced processing execution module, performs the preprocessing with regard to the print object image as the object of image processing at the higher speed than a processing speed by the advanced processing execution module, and utilizes the result of the preprocessing to implement the correction process included in the image processing. This arrangement effectively utilizes the result of the preprocessing performed in advance and prevents the advanced implementation of preprocessing from extending the time period before start of image processing required for printing the print object image and thereby extending the wait time before start of the actual printing operation. Compared with the conventional system that performs preset preprocessing after input of a print instruction, the arrangement of the invention desirably shortens the time period before start of image processing required for printing the print object image and thereby shortens the wait time before start of the actual printing operation.

In one preferable embodiment of the invention, the print control apparatus further has: a print object image specification module that selects a candidate print image as a possible option for the print object image and specifies the selected candidate print image as the print object image; and an advanced processing manager that manages the preprocessing performed by the advanced processing execution module.

In response to selection of the candidate print image, the advanced processing manager sets the selected candidate print image to a preprocessing target image as an object of the preprocessing, prior to specification of the candidate print image as the print object image, and sends an instruction to the advanced processing execution module for advanced implementation of the preprocessing with regard to the set preprocessing target image.

When the candidate print image set as the preprocessing target image is specified as the print object image, the advanced processing manager sets a result of the preprocessing executed in advance to a result of the preprocessing with regard to the print object image.

In response to selection of a candidate print image, the print control apparatus of this embodiment sets the selected candidate print image to a preprocessing target image as the object of the preprocessing, prior to specification of the candidate print image as the print object image, and sends an instruction to the advanced processing execution module for advanced implementation of the preprocessing with regard to the set preprocessing target image. When the candidate print image set as the preprocessing target image is specified as the print object image, the advanced processing manager sets a result of the preprocessing executed in advance to a result of the preprocessing with regard to the print object image. Compared with the conventional system that performs preset preprocessing after input of a print instruction, the arrangement of the invention desirably shortens the time period before start of image processing required for printing the print object image and thereby shortens the wait time before start of the actual printing operation.

In the print control apparatus of the invention, the print object image specification module may select either a preview-displayed image or an image with setting of a required number of prints as the candidate print image.

In the print control apparatus of the invention, the correction parameter may include at least one parameter selected from a first parameter group obtained by a statistical process of the print object image data representing the specified print object image, a second parameter group obtained by a face recognition process of the print object image data, and a third parameter group obtained by a red-eye reduction process of the print object image data.

In one aspect of the print control apparatus of the invention, when preprocessing with regard to another image other than the print object image specified as an object of image processing is currently being performed by the advanced processing execution module at the input timing of the image processing instruction in response to the print instruction, the image processor stops the preprocessing currently performed by the advanced processing execution module, performs the preprocessing with regard to the print object image as the object of image processing at the higher speed than the processing speed by the advanced processing execution module, and utilizes the result of the preprocessing to implement the correction process.

The print control apparatus of this aspect starts the preprocessing with regard to the print object image specified as the object of image processing without waiting for completion of the preprocessing with regard to another image other than the print object image as the object of image processing. This arrangement desirably saves the wait time for completion of the unnecessary advanced processing and thus prevents extension of the time period before start of image processing required for printing the print object image and resulting extension of the wait time before start of the actual printing operation.

The invention is not restricted to the print control apparatus described above but is also actualized by an image processing apparatus. The technique of the invention may be actualized by diversity of other applications including a corresponding print control method and a corresponding image processing method. Any of the additional arrangements described above with regard to the print control apparatus may be applied to the image processing apparatus, as well as to the print control method and the image processing method. Other possible applications of the invention include computer programs for actualizing these apparatuses or the corresponding methods, recording media in which such computer programs are recorded, and data signals that include such computer programs and are embodied in carrier waves. Any of the additional arrangements described above may be adopted in any of these other applications.

In the applications of the invention as the computer programs and the recording media in which the computer programs are recorded, the invention may be given as a whole program to control the operations of the print control apparatus or the operations of the image processing apparatus or as a partial program to exert only the characteristic functions of the invention. Available examples of the recording media include flexible disks, CD-ROMs, DVD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

BRIEF DESCRIPTION OF THE DRAWINGS

FIG. 8 is a flowchart showing a preprocessing management process performed by an advanced processing manager included in the print control apparatus of the second embodiment;

FIG. 9 is a flowchart showing continuation of the preprocessing management process performed by the advanced processing manager;

FIG. 10 is a flowchart showing continuation of the preprocessing management process performed by the advanced processing manager;

FIG. 11 shows a preprocessing management list;

DESCRIPTION OF THE PREFERRED EMBODIMENTS

Some modes carrying out the invention are described below in the following sequence as preferred embodiments with reference to the accompanied drawings:

A. First Embodiment
   A-1. Configuration and General Operations of Print Control Apparatus
   A-2. Advanced Implementation of Preprocessing
   A-3. Advanced Processing Wait Decision Process in Image Processing Flow
B. Second Embodiment
   B-1. Configuration and General Operations of Print Control Apparatus
   B-2. Print Object Image Specification Process
   B-3. Preprocessing Management Process
   B-4. Concrete Example of Advanced Implementation of Preprocessing
   B-5. Effects of Embodiment
C. Modifications

A. First Embodiment

A-1. Configuration and General Operations of Print Control Apparatus

Figure 1:
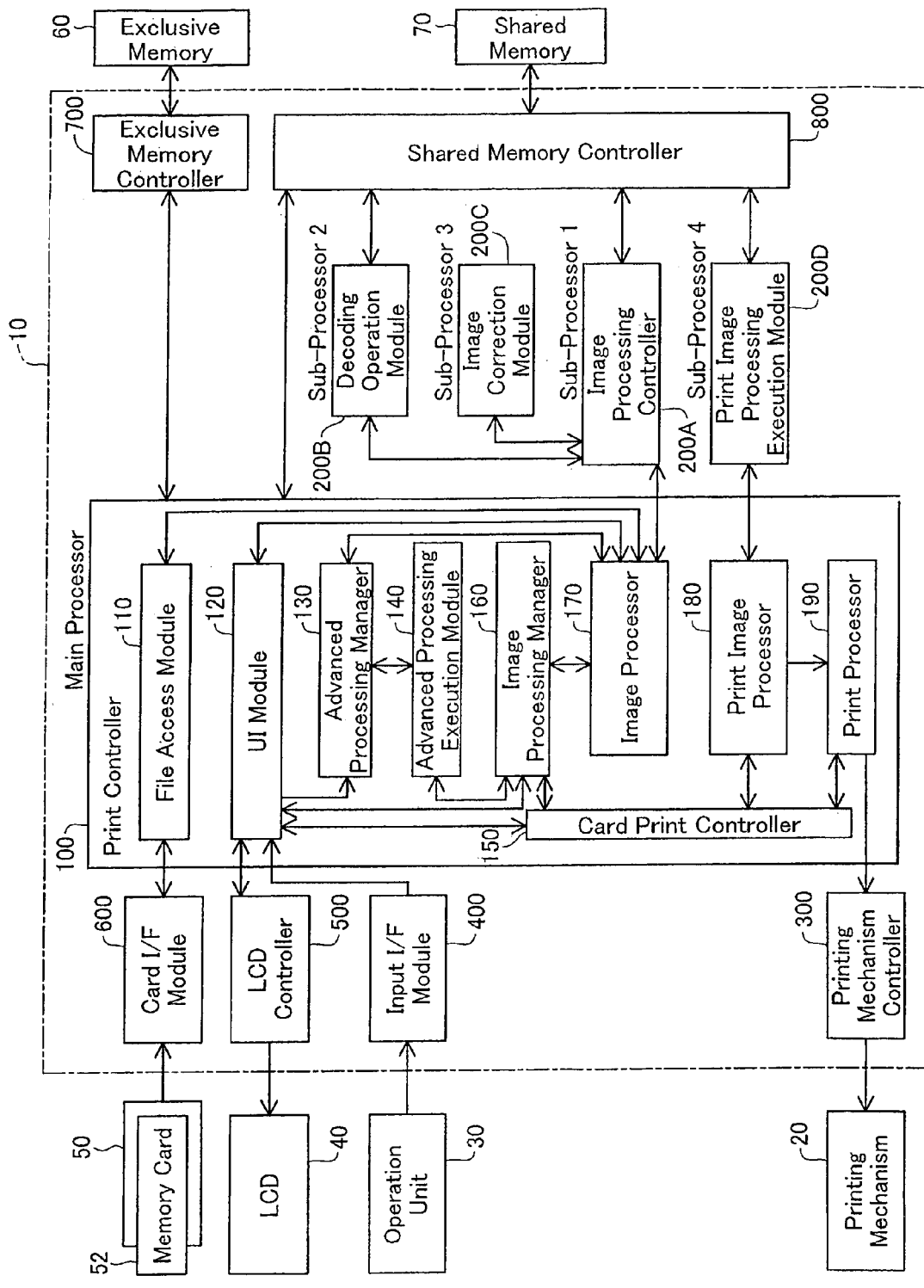
FIG. 1 is a functional block diagram showing the configuration of a print control apparatus in a first embodiment of the invention.

FIG. 1 is a functional block diagram showing the configuration of a print control apparatus 10 in a first embodiment of the invention. The print control apparatus 10 is a microprocessor having multi-processor system integrated on one semiconductor substrate. Each of multiple processors represents a unit having a CPU, a memory, a bus controller, and other peripheral circuits. In the structure of this embodiment shown in FIG. 1, the print control apparatus 10 includes one main processor 100 and four sub-processors 200A through 200D ('sub-processor 1' through 'sub-processor 4' in the illustration). The print control apparatus 10 also includes various peripheral circuits, in addition to the multiple processors 100 and 200A through 200D. The peripheral circuits include a printing mechanism controller 300 constructed as a circuit for controlling the operations of a printing mechanism 20, an input I/F module 400 constructed as a circuit for controlling the input operations of an operation unit 30, an LCD controller 500 for controlling the display operations on a liquid crystal panel (LCD) 40 as a display device, a card I/F module 600 constructed as a circuit for controlling the data reading operations from a memory card 52 inserted in a card slot 50, an exclusive memory controller 700 for controlling accesses from the main processor 100 to an exclusive memory 60, and a shared memory controller 800 for controlling accesses from the respective processors 100 and 200A through 200D to a shared memory 70. Peripheral circuits irrelevant to the characteristic of the invention are omitted from the system configuration shown in FIG. 1.

The multiple processors integrated to the print control apparatus 10 read and execute predetermined programs for the respective processors stored in the exclusive memory 60 to work as corresponding functional blocks. The main processor 100 reads and executes a specific program for the main processor 100 stored in the exclusive memory 60 to work as a corresponding functional block described below. Relevant programs for the respective sub-processors 200A through 200D are read from the exclusive memory 60 and are stored in the shared memory 70, while the main processor 100 reads the specific program for the main processor 100 from the exclusive memory 60. The sub-processors 200A through 200D respectively read and execute the relevant programs stored in the shared memory 70 to work as corresponding functional blocks described below.

The main processor 100 works as a functional block (print controller) for controlling the overall printing-related operations. In the description hereafter, the main processor 100 is also called the 'print controller 100'.

The print controller 100 has functional blocks of a file access module 110, a user interface module (UI module) 120, an advanced processing manager 130, an advanced processing execution module 140, a card print controller 150, an image processing manager 160, an image processor 170, a print image processor 180, and a print processor 190.

The file access module 110 controls the read-out operation of photo image data stored in the memory card 52.

The UI module 120 opens a selection window on the LCD 40 to allow the user's selection of each desired photo image to be printed as a print object image.

Figure 2:
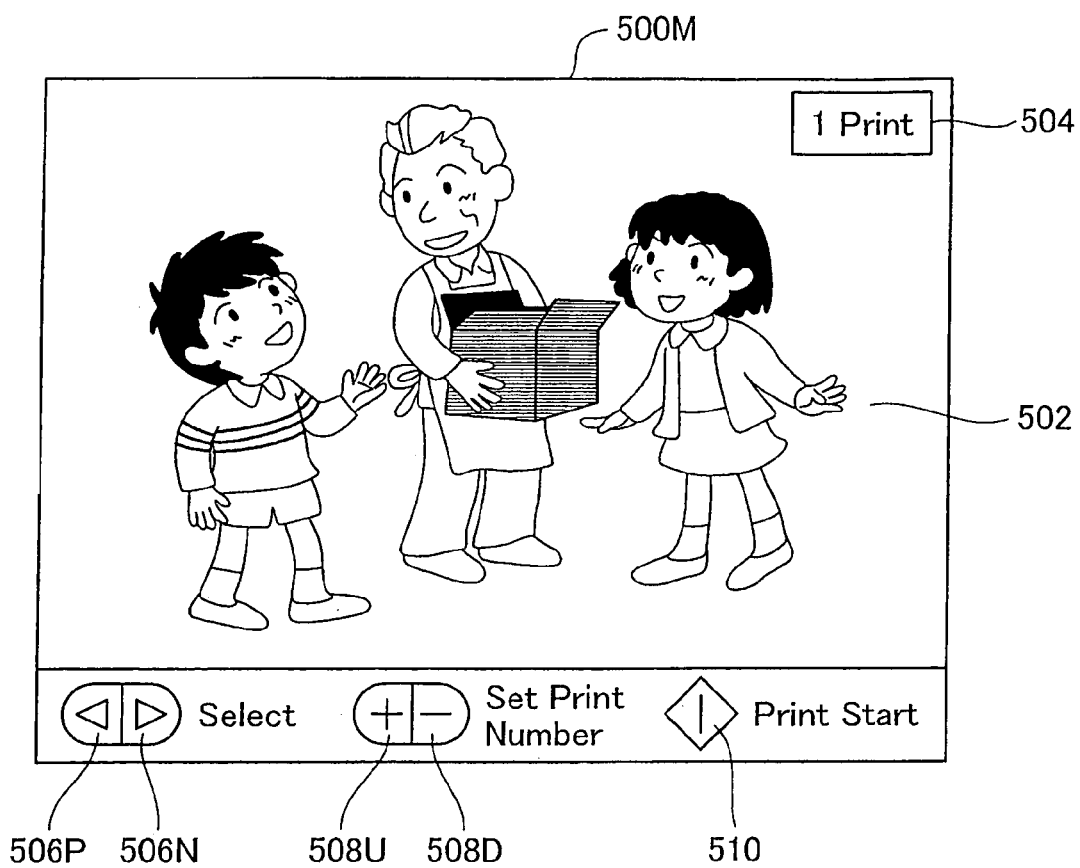
FIG. 2 shows one example of a selection window displayed on an LCD in the print control apparatus of the first embodiment.

FIG. 2 shows one example of the selection window displayed on the LCD 40. In the illustrated example of FIG. 2, a selection window 500M is opened on the LCD 40 to allow the user's selection of a desired photo image (photograph) as an object of printing. A candidate print image represented by preview-processed candidate print image data is displayed in a preview display field 502 in the selection window 500M. The user operates selection buttons 506P and 506N on the selection window 500M of FIG. 2 to change the preview display from the currently displayed photo image as the candidate print image to a prior photo image or a later photo image. The selection buttons 506P and 506N correspond to specific buttons on the operation unit 30. The selection button 506P is operated to select a prior photo image, and the selection button 506N is operated to select a later photo image. The UI module 120 sends a request for advanced implementation of preprocessing (hereafter referred to as 'advanced preprocessing request' or 'advanced processing request') with regard to a photo image selected as the candidate print image to the advanced processing manager 130. The UI module 120 also sends an image processing request to the image processing manager 160 to display a photo image, which is stored as photo image data in the memory card 52, as the candidate print image in the selection window 500M on the LCD 40.

When the user operates the operation unit 30 to set the required number of prints of a photo image currently displayed as the candidate print image on the open selection window 500M, the UI module 120 specifies the currently displayed photo image as a print object image. The UI module 120 then informs the advanced processing manager 130 of setting the currently displayed candidate print image to a print object image. The user operates print number setting buttons 508U and 508D on the selection window 500M of FIG. 2 to set 1 or a greater number to the required number of prints. This specifies the currently displayed candidate print image as the print object image. The print number setting buttons 508U and 508D correspond to specific buttons on the operation unit 30. The print number setting button 508U is operated to increase the required number of prints, and the print number setting button 508D is operated to decrease the required number of prints.

The user operates the operation unit 30 to give a print start command. In the illustrated example of FIG. 2, the user operates a print start button 510 on the selection window 500M, which corresponds to a specific button on the operation unit 30, to give a print start command. The UI module 120 receives the user's print start command and sends a print instruction to the card print controller 150 to start printing.

The advanced processing manager 130 receives the advanced preprocessing request from the UI module 120 and sends a preprocessing instruction to the advanced processing execution module 140 to implement the required preprocessing as described later. The advanced processing manager 130 manages the results of advanced preprocessing.

The advanced processing execution module 140 receives the preprocessing instruction from the advanced processing manager 130 and performs the required preprocessing to set correction parameters used for image correction in the course of image processing as described later. The preprocessing of this embodiment includes at least one of a statistical process to determine a maximum luminance, a minimum luminance, an average luminance, and a median luminance as characteristic amounts representing the characteristics of a print object image, a face recognition process to identify the presence of any human face in the print object image, and a red-eye reduction process to reduce and correct the red eye in the print object image. In the structure of this embodiment, the advanced processing execution module 140 performs all the statistical process, the face recognition process, and the red-eye analysis process. The conventional preprocessing samples print object image data at a preset proportion and executes the statistical process and the face recognition process based on a histogram created according to the sampled print object image data. The preprocessing of this embodiment thus includes this sampling operation.

In response to the print instruction received from the UI module 120, the card print controller 150 controls image processing executed by the image processor 170 under management of the image processing manager 160, print image data generation executed by the print image processor 180, and printing executed by the print processor 190 to implement printing.

The image processing manager 160 gives an image processing instruction to the image processor 170 and controls the series of image processing performed by the image processor 170.

Upon decision of non-wait for completion of advanced processing, the image processor 170 stops the advanced processing currently executed by the advanced processing execution module 140 and performs preprocessing and image processing for printing (hereafter may be referred to as 'main processing'). Upon decision of wait for completion of advanced processing, on the other hand, the image processor 170 waits until reception of a notification of completion of advanced processing by the advanced processing execution module 140 and then performs the main processing.

The photo image data stored in the memory card 52 are, for example, compressed data in a JPEG format. The image processor 170 accordingly executes a decoding operation as one of required main processing operations to expand the photo image data of the specified print object image (hereafter referred to as the print object image data) read from the memory card 52 into image data in an RGB format.

In addition to the decoding operation, the image processor 170 performs an image correction operation with regard to original image data or expanded image data, which is obtained by expansion of the print object image data. The image correction operation implements at least one of image corrections with the correction parameters set by the preprocessing, for example, color correction, brightness correction, contrast correction, saturation correction, noise elimination, smoothing, and contour correction. The image processor 170 also performs a resolution conversion process to convert the resolution of the print object image data and a layout process to generate layout image data for specifying arrangement of an image represented by the print object image data at an actual printing position on a printing medium.

The image processor 170 does not actually implement the series of image processing described above but gives an instruction for implementation of a required operation to the first sub-processor 200A functioning as the image processing controller. In response to reception of the instruction for implementation of the required operation, the first sub-processor 200A controls a relevant one of the first sub-processor 200A through the third sub-processor 200C to actually implement the required operation specified by the instruction.

Under control of the card print controller 150, the print image processor 180 generates print image data, based on image data that has been subjected to image processing (main processing) by the image processor 170. The print image data is used for actual printing of a resulting image on a printing medium. For example, in an inkjet printing apparatus, the print image data is binary data representing arrangement of dots on a printing medium. Like the image processor 170, the print image processor 180 does not actually generate the print image data but gives an instruction for generating print image data to the fourth sub-processor 200D functioning as the print image processing execution module. In response to reception of the instruction for generating print image data, the fourth sub-processor 200D actually generates print image data.

Under control of the card print controller 150, the print processor 190 controls the printing mechanism 20 via the printing mechanism controller 300 according to the print image data generated by the print image processor 180 to implement an actual printing operation.

The first sub-processor 200A works as a functional block of image processing controller to control a required image processing operation in response to an instruction from the image processor 170. In the description hereafter, the first sub-processor 200A is also called the 'image processing controller 200A'.

The second sub-processor 200B works as a functional block of decoding operation module or image expansion module to execute a decoding operation or image expansion operation of decoding image data in the JPEG format, in response to an instruction given by the image processing controller 200A. In the description hereafter, the second sub-processor 200B is also called the 'decoding operation module 200B'.

The decoding operation module 200B actually performs the decoding operation, in response to a decoding instruction given by the image processor 170 via the image processing controller 200A.

The third sub-processor 200C works as a functional block of image correction module to execute an image correction operation, in response to an instruction given by the image processing controller 200A as described later in detail. In the description hereafter, the third sub-processor 200C is also called the 'image correction module 200C'.

The fourth sub-processor 200D works as a functional block of print image processing execution module to generate print image data according to the image data processed by the image processor 170. In the description hereafter, the fourth sub-processor 200D is also called the 'print image processing execution module 200D'.

The characteristic of this embodiment is a series of processing executed in response to the user's print start command, while the advanced processing execution module 140 is currently performing advanced processing. When the currently-executed advanced processing is preprocessing with regard to a print object image specified as a target of image processing by the image processor 170, the control procedure of this embodiment determines whether to wait for completion of the currently-executed advanced processing or to stop the currently-executed advanced processing and make the image processor 170 newly start the preprocessing according to a progress degree of the advanced processing and performs a required series of processing based on the result of the determination. The description regards a series of advanced implementation of preprocessing performed by the advanced processing execution module 140 and an advanced processing wait decision process performed by the image processor 170 in this sequence.

A-2. Advanced Implementation of Preprocessing

Figure 3:
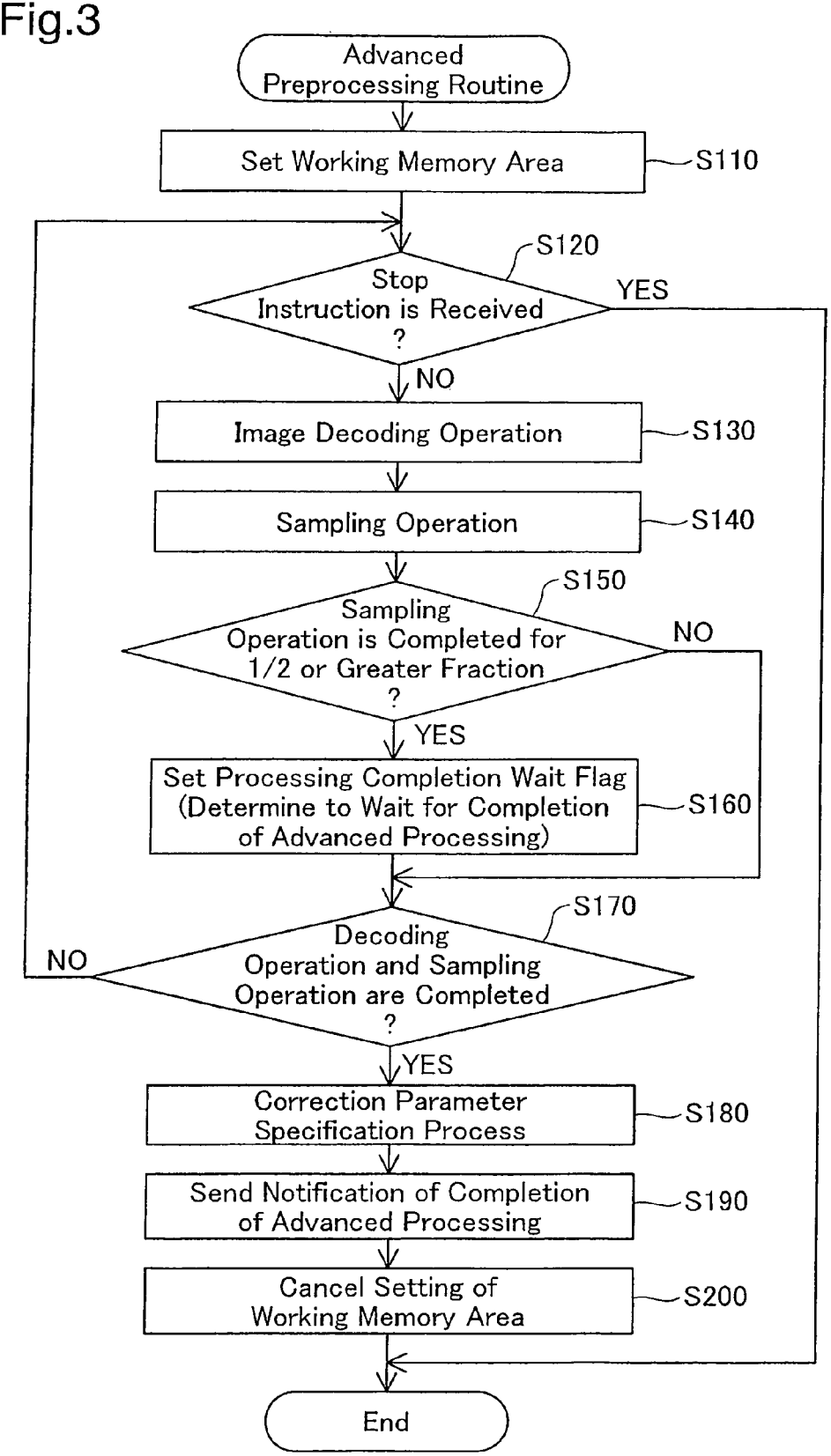
FIG. 3 is a flowchart showing a series of advanced implementation of preprocessing performed by an advanced processing execution module in the print control apparatus of the first embodiment.

FIG. 3 is a flowchart showing a series of advanced implementation of preprocessing performed by the advanced processing execution module 140. The advanced processing execution module 140 starts the following advanced preprocessing routine, in response to an advanced preprocessing request received from the advanced processing manager 130.

The advanced preprocessing routine first sets a working memory area for preprocessing in the exclusive memory 60 (step S110).

The advanced preprocessing routine then determines whether a stop instruction of advanced processing is given by the image processor 170 (step S120). Upon no reception of the stop instruction of advanced preprocessing (step S120: no), the processing of steps S130 through S160 is repeatedly executed as long as a decision result at step S170 does not show a start of the processing of next step S180 (step S170: yes) but shows a return to the processing of step S120 (step S170: no). Upon reception of the stop instruction of advanced preprocessing (step S120: yes), on the other hand, the advanced preprocessing routine is terminated immediately.

The advanced preprocessing routine performs an image decoding operation of a candidate print image specified as a target of advanced processing at step S130, and samples candidate print image data obtained by the image decoding operation at a preset rate to generate a histogram at step S140.

At subsequent step S150, it is determined whether the sampling operation has been completed for ½ or a greater fraction of the whole candidate print image data. In the case of completion of the sampling operation for ½ or the greater fraction of the candidate print image data (step S150: yes), the advanced preprocessing routine determines to wait for completion of the currently-executed advanced processing and sets a processing completion wait flag at step S160 and goes to step S170. In the case of no completion of the sampling operation for ½ of the candidate print image data (step S150: no), on the other hand, the advanced preprocessing routine directly goes to step S170.

At step S170, it is determined whether the decoding operation and the sampling operation have been completed for all the candidate print image data. In the case of no completion of the decoding operation and the sampling operation for all the candidate print image data (step S170: no), the advanced preprocessing routine goes back to step S120 and repeats the processing of steps S120 to S160 until completion of the decoding operation and the sampling operation for all the candidate print image data (step S170: yes). In the case of completion of the decoding operation and the sampling operation for all the candidate print image data (step S170: yes), the advanced preprocessing routine goes to step S180.

At step S180, the advanced preprocessing routine performs a correction parameter specification process. As mentioned previously, the correction parameter specification process includes the statistical process to determine the maximum luminance, the minimum luminance, the average luminance, and the median luminance as the characteristic amounts representing the characteristics of a print object image, the face recognition process to identify the presence of any human face in the print object image, and the red-eye reduction process to reduce and correct the red eye in the print object image.

After execution of the correction parameter specification process, the advanced preprocessing routine sends the advanced processing manager 130 a notification of completion of advanced processing with regard to the candidate print image at step S190. When the print candidate image is specified as the print object image, the routine also sends the image processor 170 the notification of completion of advanced processing with regard to the print object image. The advanced preprocessing routine cancels the setting of the working memory area and at step S200 and is then terminated.

A-3. Advanced Processing Wait Decision Process in Image Processing Flow

Figure 4:
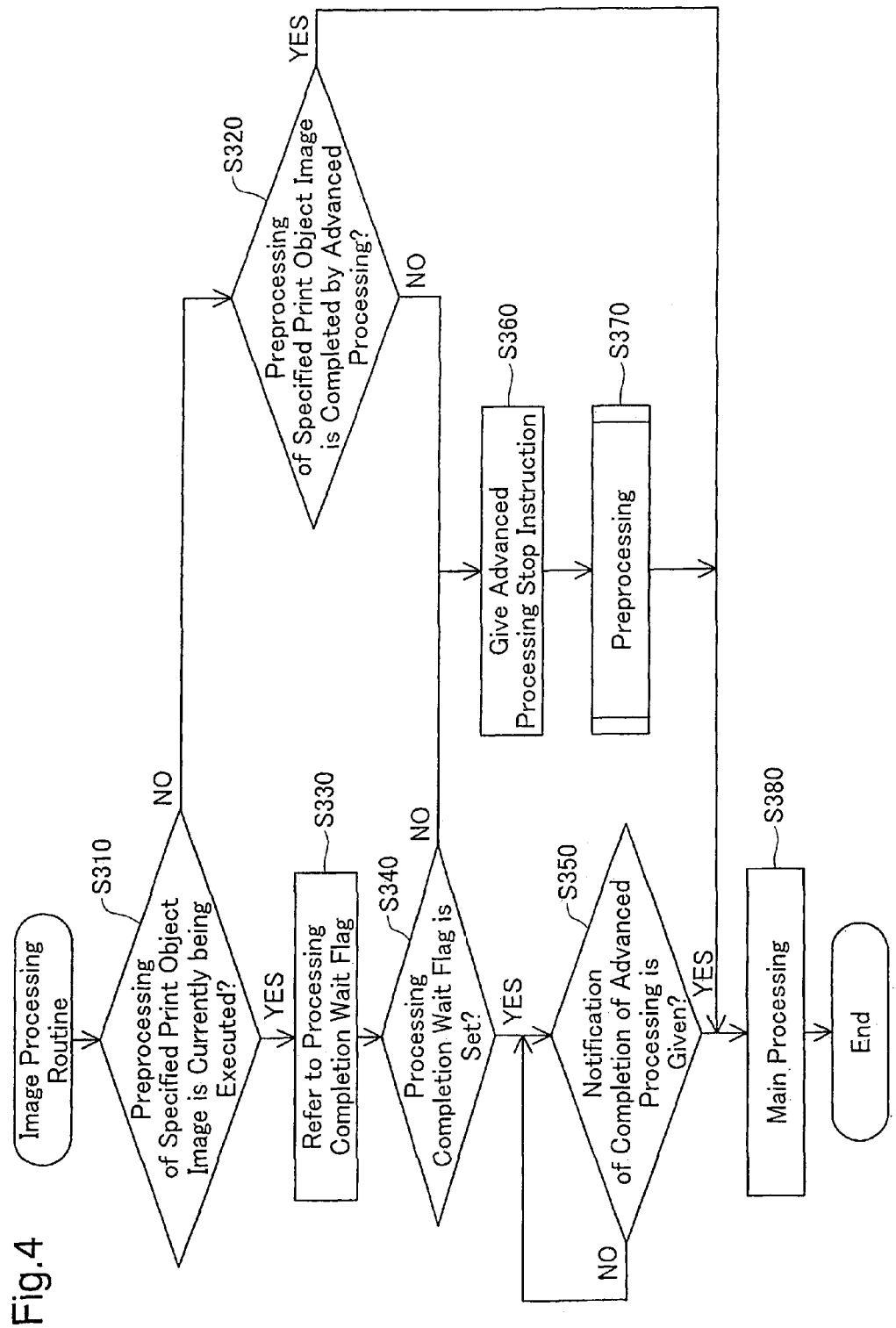
FIG. 4 is a flowchart showing a series of image processing performed by an image processor in the print control apparatus of the first embodiment.

FIG. 4 is a flowchart showing a series of image processing performed by the image processor 170. The image processor 170 starts the following image processing routine, in response to an image processing instruction with regard to a print object image received from the image processing manager 160.

At step S310, it is determined whether the advanced processing execution module 140 is currently performing the preprocessing with regard to a specified print object image. At subsequent step S320, it is determined whether the preprocessing with regard to the specified print object image has been completed by the advanced processing.

Upon determination that the preprocessing of the specified print object image is currently being executed (step S310: yes), the image processing routine refers to the processing completion wait flag set by the advanced processing execution module 140 (step S330) and identifies the current status of the processing completion wait flag (step S340). In response to the setting status of the processing completion wait flag (step S340: yes), the image processing routine waits for completion of the advanced processing and repeats the decision of step S350 until reception of a notification of completion of advanced processing by the advanced processing execution module 140. After reception of the notification of completion of advanced processing (step S350: yes), the image processing routine performs the main processing (step S380). In response to the non-setting status of the processing completion wait flag (step S340: no), on the other hand, the image processing routine gives an advanced processing stop instruction to the advanced processing execution module 140 (step S360) and sequentially performs the preprocessing (step S370) and the main processing (step S380).

Figure 5:
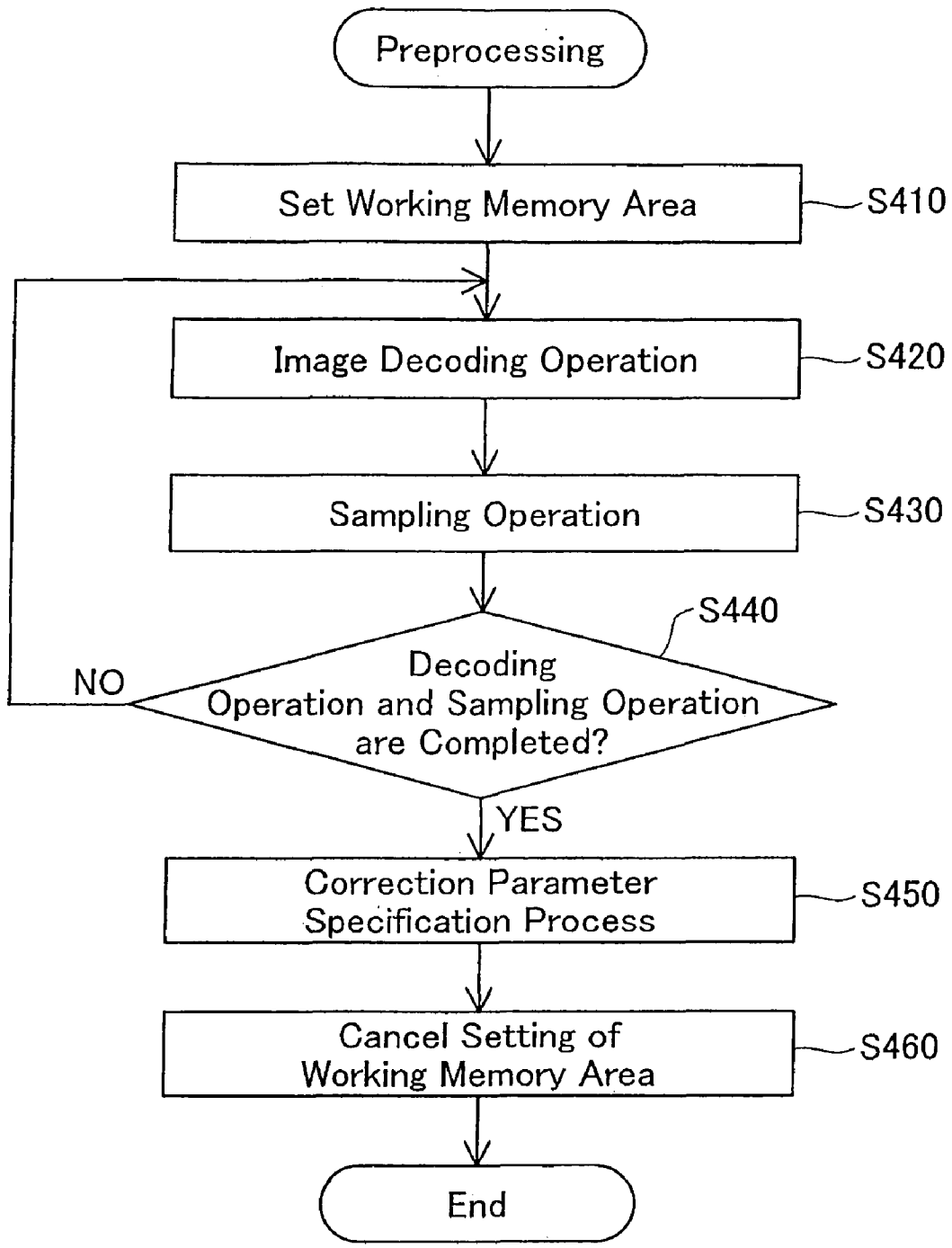
FIG. 5 is a flowchart showing the details of the preprocessing executed at step S370 in the series of image processing of FIG. 4.

FIG. 5 is a flowchart showing the details of the preprocessing executed at step S370 in the image processing routine of FIG. 4. The preprocessing routine first sets a working memory area for preprocessing in the exclusive memory 60 (step S410).

The processing of steps S420 and S430 is repeatedly executed until a decision result of step S440 shows a start of processing of step S450 (step S440: yes).

The preprocessing routine performs an image decoding operation of the print object image at step S420, and samples print object image data obtained by the image decoding operation at a preset rate to generate a histogram at step S430. The image decoding operation at step S420 is not performed by the image processor 170 but is actually executed by the decoding operation module 200B under control of the image processing controller 200A.

At step S440, it is determined whether the decoding operation and the sampling operation have been completed for the whole print object image. In the case of no completion of the decoding operation and the sampling operation for the whole print object image (step S440: no), the preprocessing routine goes back to step S420 and repeats the processing of steps S420 and S430. In the case of completion of the decoding operation and the sampling operation for the whole print object image (step S440: yes), on the other hand, the preprocessing routine performs the correction parameter specification process at step S450 and cancels the setting of the working memory area at step S460. This terminates the preprocessing routine.

The processing of steps S410 to S460 in this preprocessing routine is equivalent to the processing of steps S110, S130, S140, S170, S180, and S200 in the advanced preprocessing routine of FIG. 3.

Referring back to the flowchart of FIG. 4, upon determination that the preprocessing of the specified print object image is not currently being executed (step S310: no) and upon determination that the preprocessing of the specified print object image has not been completed by advanced processing (step S320: no), the image processing routine gives an advanced processing stop instruction to the advanced processing execution module 140 (step S360) and sequentially performs the preprocessing (step S370) and the main processing (step S380).

Upon determination that the preprocessing of the specified print object image is not currently being executed (step S310: no) but upon determination that the preprocessing of the specified print object image has been completed by advanced processing (step S320: yes), the image processing routine immediately performs the main processing (step S380).

As described above, in response to an image processing instruction of a specified object print image given to the image processor 170, the print control apparatus 10 of the embodiment determines whether the advanced processing execution module 140 is currently performing advanced preprocessing of the specified print object image. In the state of current execution of the advanced preprocessing of the specified print object image, when the sampling operation in the preprocessing has been completed for ½ or a greater fraction of the whole print object image, the print control apparatus 10 waits for completion of the advanced preprocessing and performs the main processing based on the result of advanced preprocessing. When the sampling operation has not yet been completed for ½ of the whole print object image, on the other hand, the print control apparatus 10 stops the currently-executed advanced processing and controls the image processor 170 to newly perform the required preprocessing at the higher processing speed than the advanced processing execution module 140 and subsequently perform the main processing.

When the preprocessing of the specified print object image neither is currently being executed nor has been completed by advanced processing, the print control apparatus 10 of the embodiment stops the currently-executed advanced processing and controls the image processor 170 to newly perform the required preprocessing at the higher processing speed than the advanced processing execution module 140 and subsequently perform the main processing.

When the user gives a print start command during execution of advanced processing, one possible measure unconditionally postpones execution of subsequent processing until completion of the advanced processing. If the currently-executed advanced processing regards a different image from a print object image specified as an object of printing, however, the image processor 170 can start required preprocessing of the specified print object image only after completion of the currently-executed advanced processing. The time waiting for completion of the advanced processing is rather useless wait time. This undesirably elongates the time period before starting image processing required for printing the specified print object image.

Another possible measure unconditionally stops the currently-executed advanced processing in response to input of a print instruction and controls the image processor 170 to newly start preprocessing of the specified print object image. Even when the currently-executed advanced preprocessing is in the final stage, this control procedure forcibly stops the advanced processing. This wastes the time of the advanced processing and thereby undesirably elongates the time period before starting image processing required for printing the specified print object image.

As described above, when the advanced processing currently executed at the time of input of a print instruction regards a different image from a print object image specified as an object of printing, the print control apparatus 10 of the embodiment stops the advanced processing and controls the image processor 170 to perform the high-speed preprocessing with regard to the specified print object image. Such control desirably eliminates the rather useless wait time for completion of the advanced processing with regard to the different image from the specified print object image. This arrangement desirably shortens the time period before starting the image processing required for printing the specified print object image as the object of printing and accordingly shortens the total wait time before start of an actual printing operation.

When the advanced processing currently executed at the time of input of a print instruction regards a print object image specified as an object of printing, the print control apparatus 10 of the embodiment waits for completion of the advanced processing on condition that the sampling operation in the preprocessing has been completed for ½ or a greater fraction of the whole print object image. When the sampling operation has not yet been completed for ½ of the whole print object image, however, the print control apparatus 10 stops the advanced processing and controls the image processor 170 to newly start the high-speed preprocessing. This arrangement desirably prevents the time of advanced processing from being wasted. The print control apparatus 10 of the embodiment waits for completion of the advanced processing on condition that the wait for completion of the advanced processing is more efficient than renewed execution of preprocessing by the image processor 170. The print control apparatus 10 of the embodiment stops the advanced processing and controls the image processor 170 to newly start the preprocessing, on the other hand, on condition that the renewed execution of high-speed preprocessing by the image processor 170 is more efficient than the wait for completion of the advanced processing. This arrangement desirably shortens the time period before starting the image processing required for printing the specified print object image as the object of printing and accordingly shortens the total wait time before start of an actual printing operation.

As described above, the print control apparatus 10 of the embodiment effectively uses the result of advanced preprocessing and prevents the time period before starting the image processing (main processing) required for the specified print object image and the total wait time before start of the actual printing operation from being elongated by the advanced preprocessing.

B. Second Embodiment

B-1. Configuration and General Operations of Print Control Apparatus

The configuration of a print control apparatus 10 in a second embodiment of the invention is identical with the configuration of the print control apparatus 10 of the first embodiment shown in FIG. 1 and is thus not specifically described here in detail.

The UI module 120 opens a selection window on the LCD 40 to allow the user's selection of each desired photo image to be printed as a print object image. The user operates the operation unit 30 to select a preview-displayed photo image in the selection window as a candidate print image. The UI module 120 sends a request for advanced implementation of preprocessing (hereafter referred to as 'advanced preprocessing request' or 'advanced processing request') with regard to the photo image selected as the candidate print image to the advanced processing manager 130. The UI module 120 also sends an image processing request to the image processing manager 160 to display a photo image, which is stored as photo image data in the memory card 52, as the candidate print image in the selection window on the LCD 40. When the user operates the operation unit 30 to set the required number of prints of a photo image currently displayed in the open selection window, the UI module 120 specifies the currently displayed photo image as a print object image and holds the result of advanced preprocessing. When the user operates the operation unit 30 to give a print start command, the UI module 120 sends a print instruction to the card print controller 150 to start printing.

The advanced processing manager 130 receives the advanced preprocessing request from the UI module 120 and sends a preprocessing instruction to the advanced processing execution module 140 to implement the required preprocessing. The advanced processing manager 130 also manages the results of advanced preprocessing.

The advanced processing execution module 140 receives the preprocessing instruction from the advanced processing manager 130 and performs the required preprocessing to set correction parameters used for image correction in the course of image processing.

The image processing manager 160 receives an image processing request with regard to a specified print object image from the UI module 120 and sends a request for implementation of preprocessing (hereafter referred to as 'preprocessing request') with regard to the specified print object image to the advanced processing manager 130. In response to reception of a notification of completion of preprocessing from the advanced processing manager 130, the image processing manager 160 sends an image processing instruction to the image processor 170 and controls a series of image processing executed by the image processor 170.

When the required preprocessing has been completed by advanced processing prior to the user's print start command, the notification of completion of preprocessing is immediately responded to the preprocessing request. There is accordingly a very little time required for the preprocessing in the course of an actual printing operation.

The characteristic of this embodiment is a start of required preprocessing, prior to specification of a print object image and input of a print instruction. The UI module 120 sends an advanced preprocessing request to the advanced processing manager 130 in the course of preview display of a photo image selected as a candidate print image for specification of a print object image, before a preprocessing request is given from the image processing manager 160 to the advanced processing manager 130. The preprocessing manager 130 accordingly starts the required preprocessing, prior to specification of the print object image and input of a print instruction. The following description sequentially regards a print object image specification process and a preprocessing management process related to the advanced implementation of required preprocessing. A concrete example of the advanced implementation of required preprocessing is then described in detail.

B-2. Print Object Image Specification Process

Figure 6:
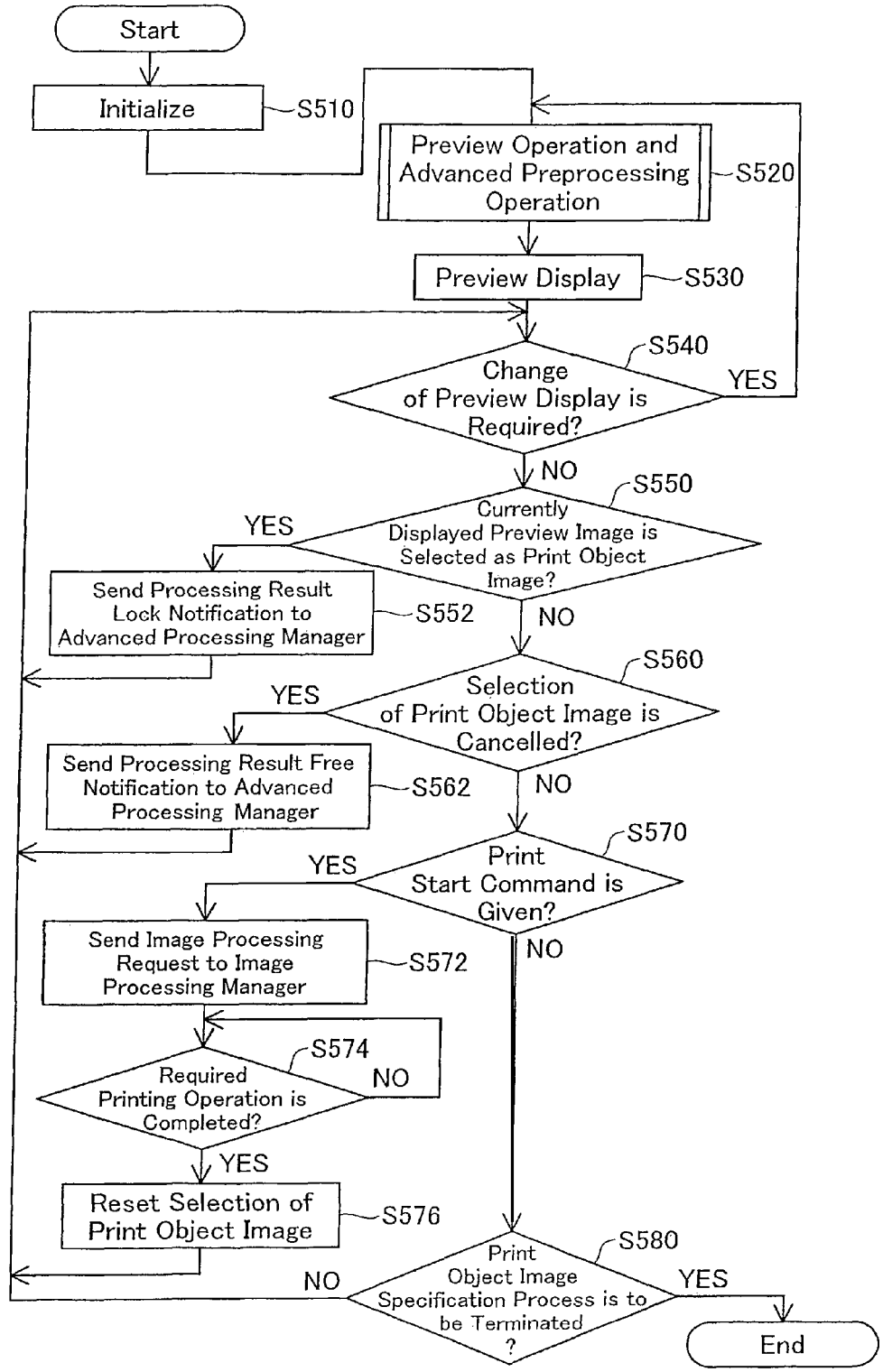
FIG. 6 is a flowchart showing a print object image specification process performed by a UI module included in a print control apparatus in a second embodiment of the invention.

FIG. 6 is a flowchart showing a print object image specification process performed by the UI module 120. The print object image specification process is triggered by, for example, the user's operation of the operation unit 30 to select a card print option for printing a photo image stored in the memory card 52 on a menu window open on the LCD 40.

In the print object image specification routine of FIG. 6, the UI module 120 first performs a predetermined initialization operation at step S510. For example, the UI module 120 searches photo image data stored in the memory card 52 via the file access module 110, creates a list of image files rearranged in the alphabetical order of image file names, and stores the created list in the exclusive memory 60. The photo image data stored in the memory card 52 are afterward handled in the rearranged alphabetical order of image file names. For example, when four photo image data having image file names 'A', 'B', 'C', and 'D' are stored in the memory card 52, preview photo images of these four photo image data are displayed in the alphabetical order of the image file names 'A', 'B', 'C', and 'D'. Even when the preview photo images of the photo image data stored in the memory card 52 are specified as the print object images in the order of the image file names 'D', 'C', 'B', and 'A', the specified print object images are printed in the rearranged alphabetical order of the image file names 'A', 'B', 'C', and 'D'.

At step S520, the UI module 120 performs a preview operation and an advanced preprocessing operation with regard to first photo image data in the alphabetical order. For example, when the four photo image data having the image file names 'A', 'B', 'C', and 'D' are stored in the memory card 52, the preview operation and the advanced preprocessing operation are performed first with regard to the first photo image data having the image file name 'A'.

Figure 7:
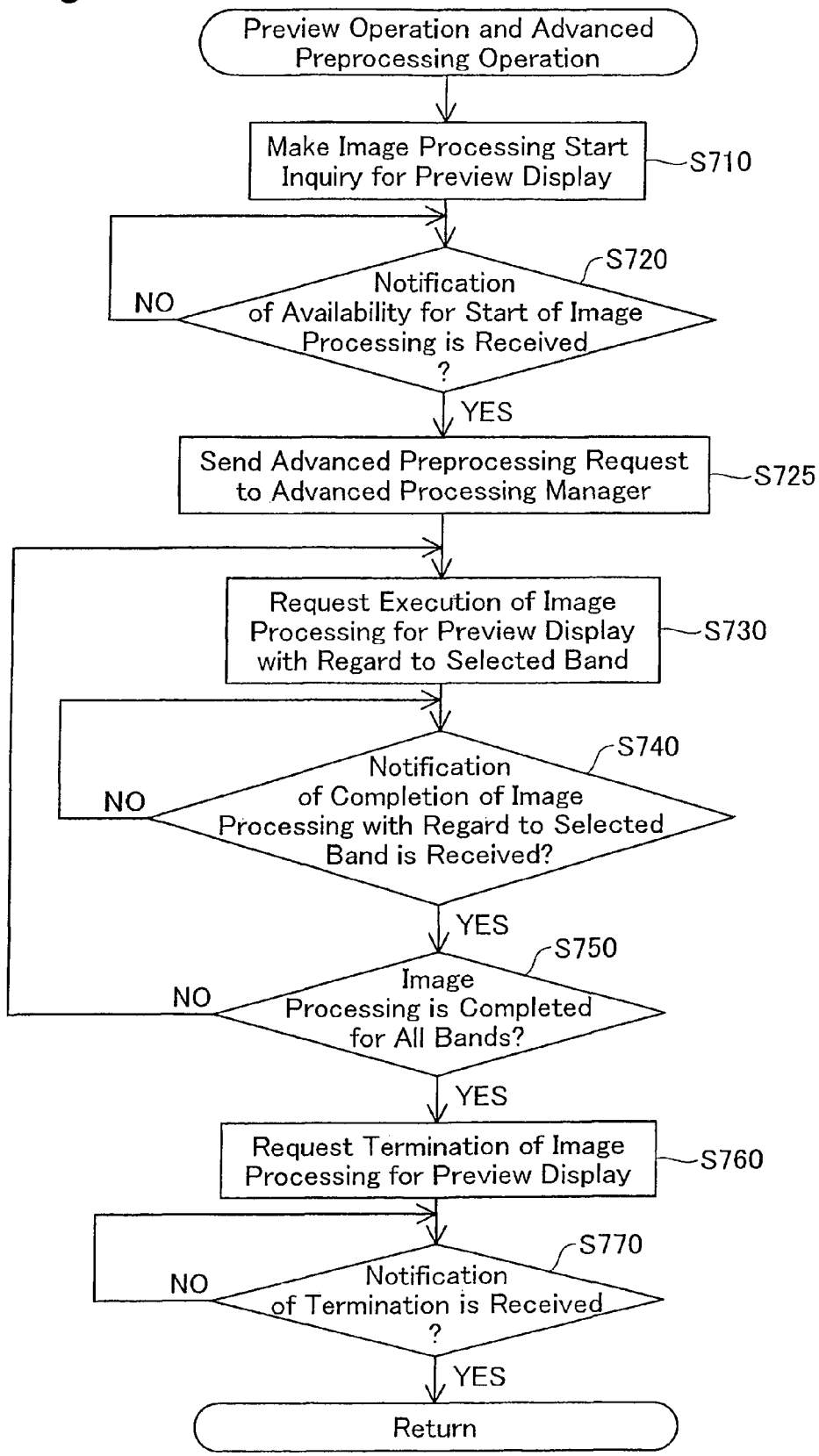
FIG. 7 is a flowchart showing the details of the preview operation and the advanced preprocessing operation executed at step S520 in the print object image specification process of FIG. 6.

FIG. 7 is a flowchart showing the details of the preview operation and the advanced preprocessing operation executed at step S520 in the print object image specification process of FIG. 6.

On start of the preview operation and the advanced preprocessing operation (step S520 in FIG. 6), the UI module 120 makes an image processing start inquiry for preview display to the image processor 170 at step S710 and identifies whether the image processor 170 is available for start of a required series of image processing for preview display.

At step S720, the UI module 120 waits until reception of a notification of availability for start of image processing (start available notification) from the image processor 170 as a response to the image processing start inquiry made at step S710. Reception of the start available notification (step S720: yes) triggers the processing of step S725.

At step S725, the UI module 120 specifies the photo image data representing the photo image preview-displayed as the candidate print image as candidate print image data and sends an advanced preprocessing request with regard to the specified candidate print image data to the advanced processing manager 130. The advanced processing manager 130 then sends a preprocessing instruction to the advanced processing execution module 140. The advanced processing execution module 140 performs the required preprocessing by utilizing the vacant time when the other functional blocks of the main processor 100 stop operation. The detailed operation of the advanced processing manager 130 will be described in detail.

The UI module 120 requests the image processor 170 to execute required image processing for preview display of the specified candidate print image at step S730. The image processing is generally performed in the units of blocks (bands) after division of the photo image data selected as the candidate print image data into multiple blocks (bands). The request for image processing is accordingly made with regard to each selected band at step S730.

The image processor 170 gives an instruction for a decoding operation with regard to the selected band of the candidate print image data representing the candidate print image as the object of preview display to the decoding operation module 200B via the image processing controller 200A. The decoding operation module 200B performs the required decoding operation on the selected band of the candidate print image data, in response to the instruction from the image processing controller 200A.

At subsequent step S740, the UI module 120 waits for reception of a notification of completion of the image processing with regard to the selected band requested at step S730 from the decoding operation module 200B via the image processing controller 200A. The routine goes to step S750 upon reception of the notification of completion of the required image processing with regard to the selected band (step S740: yes).

At step S750, it is determined whether the required image processing for preview display has been completed with regard to all the bands of the candidate print image data as the object of preview display. When there is any unprocessed band (step S750: no), the routine goes back to step S730 to make the request for execution of the required image processing for preview display with regard to the unprocessed band. On completion of the required image processing for all the bands (step S750: yes), on the other hand, the routine goes to step S760. The processing of steps S730 to step S750 is repeated until completion of the required image processing with regard to all the bands.

The UI module 120 requests the image processor 170 to terminate the image processing for preview display at step S760.

At subsequent step S770, the UI module 120 waits until reception of a notification of termination from the image processor 170 as a response to the termination request made at step S760. On reception of the notification of termination (step S770: yes), the UI module 120 exits from the preview operation and the advanced preprocessing operation of FIG. 7 and proceeds to step S530 in the print object image specification routine of FIG. 6.

At step S530, a preview candidate print image represented by the specified candidate print image data expanded by the preview operation is displayed on the LCD 40 as shown in FIG. 2. In the illustrated example of FIG. 2, the selection window 500M is opened on the LCD 40 to allow the user's selection of a desired photo image (photograph) as an object of printing. The preview candidate print image represented by the preview-processed candidate print image data is displayed in the preview display field 502 on the selection window 500M.

The UI module 120 repeats the decisions of steps S540, S550, S560, and S570 until termination of the print object image specification process is required (step S580: yes).

It is determined at step S540 whether a change of the preview display of the photo image as the candidate print image is required. When the user operates the selection buttons 506P and 506N on the selection window 500M of FIG. 2 to change the preview display from the currently displayed photo image as the candidate print image to a prior photo image or a later photo image, the affirmative answer is given at step S540 to identify the requirement for change of the preview display of the candidate print image. As mentioned previously, the selection buttons 506P and 506N correspond to the specific buttons on the operation unit 30. The selection button 506P is operated to select a prior photo image, and the selection button 506N is operated to select a later photo image.

On requirement for the change of the preview display of the candidate print image (step S540: yes), the print object image specification routine goes back to step S520 to execute the preview operation and the advanced preprocessing operation with regard to a newly selected candidate print image and proceeds to step S530 to display a new preview candidate print image of the preview-processed candidate print image data. On no requirement for the change of the preview display of the candidate print image (step S540: no), on the other hand, the print object image specification routine proceeds to the next decision of step S550.

It is determined at step S550 whether the currently displayed preview candidate print image is selected as a print object image. When the user operates the print number setting buttons 508U and 508D on the selection window 500M of FIG. 2 to set 1 or a greater number to the required number of prints, the affirmative answer is given at step S550 to identify selection of the currently displayed preview candidate print image as the print object image. As mentioned previously, the print number setting buttons 508U and 508D correspond to the specific buttons on the operation unit 30. The print number setting button 508U is operated to increase the required number of prints, and the print number setting button 508D is operated to decrease the required number of prints. The set number of prints is shown in a print number display box 504 on the selection window 500M.

On selection of the currently displayed preview candidate print image as the print object image (step S550: yes), the print object image specification routine proceeds to step S552. On no selection of the currently displayed preview candidate print image as the print object image (step S550: no), on the other hand, the print object image specification routine goes to the decision of step S560.

At step S552, the UI module 120 sends the advanced processing manager 130 a processing result lock notification to hold the result of advanced preprocessing requested and executed in advance with regard to the candidate print image selected as the print object image. The print object image specification routine then goes back to step S540 and repeats the processing of steps S540 to S580. In the description hereafter, holding the result of advanced preprocessing is expressed as 'locking the result of advanced preprocessing'.

It is determined at step S560 whether selection of the currently displayed preview candidate print image as the print object image is cancelled out. When the user operates the print number setting buttons 508U and 508D shown in FIG. 2 to reset the required number of prints to 0, the affirmative answer is given at step S560 to identify cancellation of the selection as the print object image.

On cancellation of the selection as the print object image (step S560: yes), the print object image specification routine proceeds to step S562. On no cancellation of the selection as the print object image (step S560: no), on the other hand, the print object image specification routine goes to the decision of step S570.

At step S562, the UI module 120 sends the advanced processing manager 130 a processing result free notification to release the locked state of the result of advanced preprocessing with regard to the candidate print image of the cancelled selection as the print object image and to allow overwriting a new result of advanced processing in the storage area of the locked result of advanced preprocessing. The print object image specification routine then goes back to step S540 and repeats the processing of steps S540 to S580.

It is determined at step S570 whether a print start command is given to print the selected print object image. When the user operates the print start button 510 on the selection window 500M of FIG. 2, the affirmative answer is given at step S570 to identify the input of the print start command. As mentioned previously, the print start button 510 corresponds to the specific button on the operation unit 30.

In response to the input of the print start command (step S570: Yes), the print object image specification routine executes the processing of steps S572 to S576. The print object image specification routine then returns to step S540 and repeats the decisions of steps S540 to S580. In response to no input of the print start command (step S570: no), on the other hand, the print object image specification routine goes to the decision of step S580.

At step S572, the UI module 120 gives a print instruction with regard to the specified print object image to the card print controller 150. The card print controller 150 then sends an image processing request with regard to the specified print object image to the image processing manager 160. The image processor 170 performs required image processing under management of the image processing manager 160. Under control of the card print controller 150, the print image processor 180 generates print image data, and the print processor 190 performs a corresponding printing operation of the specified print object image.

At step S574, the UI module 120 receives a notification of completion of the required image processing as a response to the image processing request and waits until completion of the corresponding printing operation. On completion of the printing operation (step S574: yes), the print object image specification routine goes to step S576.

At step S576, the selection of the print object image is reset.

In the case of selection of multiple print object images, the processing of steps S572 to S576 is repeated for the respective print object images. Namely the card print controller 150 controls the image processing performed by the image processor 170 under management of the image processing manager 160, the generation of print image data by the print image processor 180, and the printing operation by the print processor 190 in the unit of each print object image.

It is determined at step S580 whether execution of the print object image specification routine by the UI module 120 is to be terminated. When the user operates a preset processing termination button on the operation unit 30, the affirmative answer is given at step S580 to identify requirement for termination of the printer object image specification process.

B-3. Preprocessing Management Process

FIGS. 8 through 10 are flowcharts showing a preprocessing management process performed by the advanced processing manager 130.

The advanced processing manager 130 repeats the decisions of steps S810, S820, S830, S840, S850, S860, and S870.

It is determined at step S810 whether the advanced processing manager 130 receives a preprocessing request from the image processing manager 160 after the start of printing. On reception of the preprocessing request (step S810: yes), the preprocessing management routine executes the processing of steps SS890 to S940. On no reception of the preprocessing request (step S810: no), on the other hand, the preprocessing management routine goes to the decision of step S820. The processing of steps S890 to S940 will be described below.

It is determined at step S820 whether the advanced processing manager 130 receives the processing result free notification from the UI module 120 to release the locked state of the result of advanced preprocessing. On reception of the processing result free notification (step S820: yes), the preprocessing management routine executes the processing of step S822. On no reception of the processing result free notification (step S820: no), on the other hand, the preprocessing management routine goes to the decision of step S830.

The exclusive memory 60 has predetermined number of processing result storage areas set in advance for storage of the results of preprocessing. Each processing result storage area is under management of a preprocessing management list stored in the exclusive memory 60.

FIG. 11 shows the preprocessing management list. As shown in the top view of FIG. 11, the preprocessing management list has management areas provided corresponding to the respective processing result storage areas. Management objects in each management area include an image file name that represents a print object image having the corresponding processing result storage area allocated for storage of the preprocessing result, processing result lock information that identifies whether the preprocessing result stored in the corresponding processing result storage area is to be locked, and processing completion information that identifies whether the preprocessing has been completed and whether the preprocessing result is stored in the corresponding processing result storage area. In the illustrated example of FIG. 11, the preprocessing management list has only 4 management areas. This number is, however, not essential, but the preprocessing management list may have a greater number of management areas, for example, 8, 16, and 32.

On reception of the processing result free notification (step S820: yes), the advanced processing manager 130 releases the locked state of the corresponding management area included in the preprocessing management list at step S822. The preprocessing management routine then goes back to step S810 and repeats the decisions of steps S810 to S870.

It is determined at step S830 whether the advanced processing manager 130 receives the processing result lock notification from the UI module 120 to lock the result of advanced preprocessing. On reception of the processing result lock notification (step S830: yes), the preprocessing management routine executes the processing of step S831. On no reception of the processing result lock notification (step S830: no), on the other hand, the preprocessing management routine goes to the decision of step S840.

It is determined at step S831 whether all the management areas in the preprocessing management list are in the locked state, based on the processing result lock information. When there is any unlocked management area in the preprocessing management list (step S831: no), the preprocessing management routine executes the processing of step S832. When all the management areas in the preprocessing management list are in the locked state (step S831: yes), on the other hand, the preprocessing management routine goes to the decision of step S833.

At step S832, the advanced processing manager 130 allocates one of the unlocked management areas to a print object image as the target of the processing result lock notification and changes the status of the processing result lock information to 'locked' in the allocated management area to lock the management area. The preprocessing management routine then goes back to step S810 and repeats the decisions of steps S810 to S870.

It is determined at step S833 whether the preprocessing management list has any management area corresponding to a print object image having a later print ordinal number than that of the print object image as the target of the processing result lock notification. When the preprocessing management list has no management area corresponding to the print object image having the later print ordinal number (step S833: no), the preprocessing management routine goes back to step S810 and repeats the decisions of steps S810 to S870. When the preprocessing management list has any management area corresponding to the print object image having the later print ordinal number (step S833: yes), on the other hand, the preprocessing management routine executes the processing of steps S834 and S835 and then goes back to step S810 to repeat the decisions of steps S810 to S870.

At step S834, the advanced processing manager 130 deletes the information regarding a print object image having the last print ordinal number among the print object images under management in the management areas from the preprocessing management list and creates a vacant management area in the preprocessing management list. The vacant management area is then allocated to the print object image as the target of the processing result lock notification and is locked.

In the illustrated example of FIG. 11, four print object images having the image file names A, C, E, and D are allocated in this order to the four management areas in the preprocessing management list. When the print object image as the target of the processing result lock notification has an image file name F, the print object image of the file name F has a later print ordinal number than the print object image of the file name E having the last print ordinal number among the print object images under management in the preprocessing management list. In this case, the advanced processing manager 130 neither creates any vacant management area in the preprocessing management list nor sends an advanced preprocessing request. When the print object image as the target of the processing result lock notification has an image file name B, on the other hand, the print object image of the file name B has an earlier print ordinal number than the print object image of the file name E having the last print ordinal number among the print object images under management in the preprocessing management list. In this case, the advanced processing manager 130 deletes the information in the management area allocated to the print object image of the file name E from the preprocessing management list as shown in the middle view of FIG. 11. The advanced processing manager 130 then newly allocates the vacant management area to the print object image of the file name B and locks the management area as shown in the bottom view of FIG. 11.

Figure 12:
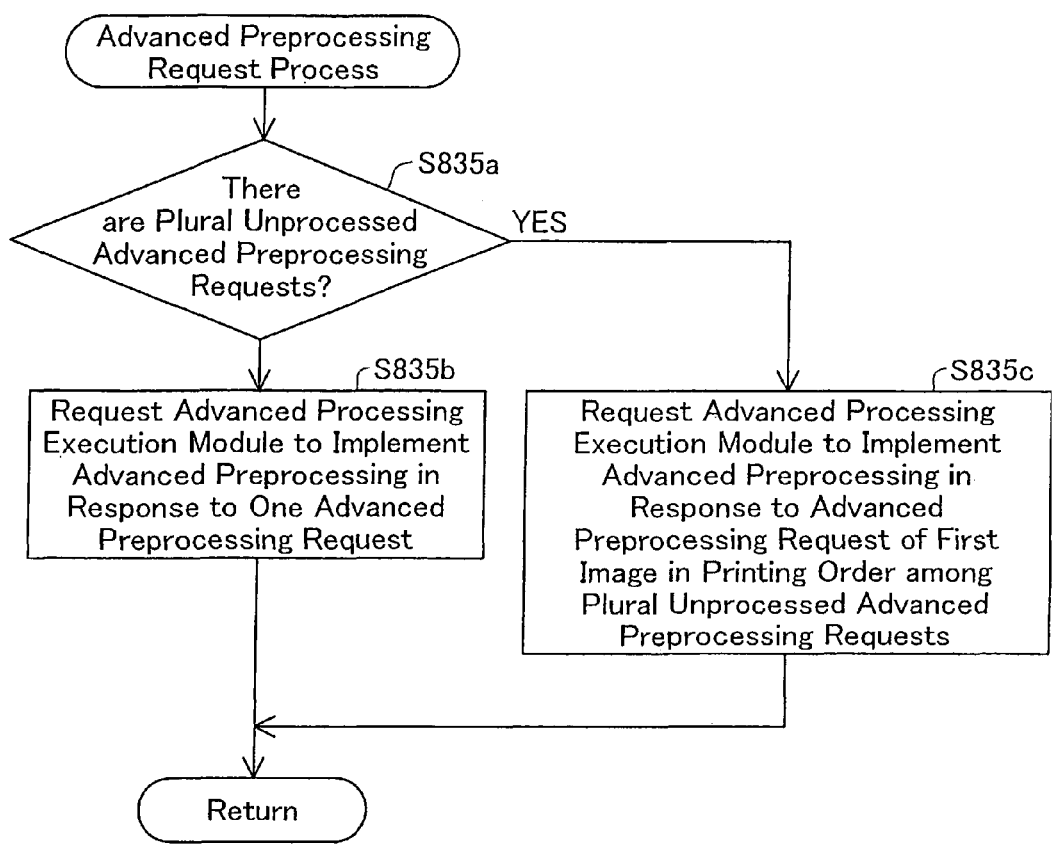
FIG. 12 is a flowchart showing the details of the advanced preprocessing request process executed at step S835 in the preprocessing management process of FIG. 8.

At step S835, the advanced processing manager 130 sends an advanced preprocessing request to the advanced processing execution module 140 with regard to the print object image as the target of the processing result lock notification. FIG. 12 is a flowchart showing the details of the advanced preprocessing request process executed at step S835.

At step S835a, the advanced processing manager 130 determines whether there are plural unprocessed advanced preprocessing requests. According to a concrete procedure, the advanced processing manager 130 checks an advanced preprocessing request buffer for storage of plural unprocessed advanced preprocessing requests.

When there is only one unprocessed advanced preprocessing request stored in the advanced preprocessing request buffer (step S835a: no), the advanced processing manager 130 requests the advanced processing execution module 140 to implement the advanced preprocessing in response to the advanced preprocessing request at step S835b. When there are plural unprocessed advanced preprocessing requests stored in the advanced preprocessing request buffer (step S835a: yes), on the other hand, the advanced processing manager 130 requests the advanced processing execution module 140 to implement the advanced preprocessing in response to an advanced preprocessing request of a first image in the printing order rearranged by the initialization process (step S510 in the flowchart of FIG. 6) among the plural unprocessed advanced preprocessing requests at step S835c. After sending the advanced preprocessing request to the advanced processing execution module 140, the preprocessing management routine goes back to step S810 in FIG. 8 and repeats the decisions of steps S810 to S870.

When no processing result lock notification is received (step S830: no) in the flowchart of FIG. 8, it is determines at step S840 (in the flowchart of FIG. 9) whether the advanced processing manager 130 receives an advanced preprocessing request from the UI module 120. On reception of the advanced preprocessing request (step S840: yes), the preprocessing management routine executes the processing of step S842. On no reception of the advanced preprocessing request (step S840: no), on the other hand, the preprocessing management routine goes to the decision of step S850.

At step S842, the advanced processing manager 130 stores the received advanced preprocessing request into the advanced preprocessing request buffer set in the exclusive memory 60 and goes back to step S810 to repeat the decisions of steps S810 to S870.

It is determined at step S850 whether the advanced processing execution module 140 is currently available for advanced implementation of preprocessing. When there is any advanced preprocessing request for which the notification of completion has not yet been sent from the advanced processing execution module 140, the advanced processing execution module 140 is expected to be currently performing the advanced preprocessing in response to the prior advanced preprocessing request. In this case, it is determined at step S850 that the advanced processing execution module 140 is currently unavailable for advanced implementation of preprocessing.

Upon determination of the current availability of the advanced processing execution module 140 for advanced implementation of preprocessing (step S850: yes), the preprocessing management routine executes the processing of step S852. Upon determination of the current unavailability of the advanced processing execution module 140 for advanced implementation of preprocessing (step S850: no), on the other hand, the preprocessing management routine goes to the decision of step S860.

At step S852, the advanced processing manager 130 sends the advanced preprocessing request to the advanced processing execution module 140. The advanced preprocessing request process at step S852 is identical with the advanced preprocessing request process at step S835 and is thus not specifically described here.

It is determined at step S860 whether the advanced processing manager 130 receives a notification of completion of advanced preprocessing from the advanced processing execution module 140, in response to the advanced preprocessing request. On reception of the notification of completion of the advanced preprocessing (step S860: yes), the preprocessing management routine executes the processing of steps S862 and S864 and then goes back to step S810 to repeat the decisions of steps S810 to S870. On no reception of the notification of completion of the advanced preprocessing (step S860: no), on the other hand, the preprocessing management routine goes to the decision of step S870.

At step S862, the advanced processing manager 130 deletes the advanced preprocessing request, for which the notification of completion of the advanced processing has been received from the advanced processing execution module 140, from the storage in the advanced preprocessing request buffer. At step S864, the advanced processing manager 130 changes the status of the processing completion information to 'completed' in the corresponding management area of the preprocessing management list (see FIG. 12) stored in the exclusive memory 60. The preprocessing management routine then goes back to step S810 to repeat the decisions of steps S810 to S850.

It is determined at step S870 whether the advanced processing manager 130 receives a termination request for termination of the advanced preprocessing from the UI module 120. On no reception of the termination request for termination of the advanced preprocessing (step S870: no), the preprocessing management routine goes back to step S810 to repeat the decisions of steps S810 to S870. On reception of the termination request for termination of the advanced preprocessing (step S870: yes), on the other hand, the preprocessing management routine goes to the decision of step S880.

It is determined at step S880 whether the received termination request for termination of the advanced preprocessing regards the advanced preprocessing request currently processed by the advanced processing execution module 140. When the received termination request regards the currently processed advanced preprocessing request (step S880: yes), the advanced processing manager 130 sends a cancellation request for cancellation of the currently processed advanced preprocessing request to the advanced processing execution module 140 at step S884. When the received termination request does not regard the currently processed advanced preprocessing request but regards an unprocessed advanced preprocessing request (step S880: no), on the other hand, the advanced processing manager 130 deletes the unprocessed advanced preprocessing request from the storage in the advanced preprocessing request buffer at step S882. The preprocessing management routine then goes back to step S810 to repeat the decisions of steps S810 to S870.

The advanced processing manager 130 manages the advanced implementation of preprocessing according to this preprocessing management flow.

As mentioned previously, when the advanced processing manager 130 receives the preprocessing request from the image processing manager 160 after the start of printing (step S810: yes), the preprocessing management routine executes the processing of steps S890 to S940 in the flowchart of FIG. 10.

It is determined at step S890 whether the preprocessing specified by the received preprocessing request has been implemented in advance by the advanced processing execution module 140. In the case of advanced implementation of the requested preprocessing (step S890: yes), the preprocessing management routine executes the processing of step S892. In the case of no advanced implementation of the requested preprocessing (step S890: no), on the other hand, the preprocessing management routine goes to the decision of step S900.

At step S892, the advanced processing manager 130 immediately sends a notification of completion of the required preprocessing to the image processing manager 160. The preprocessing management routine then goes back to step S810 to repeat the decisions of steps S810 to S870.

It is determined at step S900 whether the preprocessing specified by the received preprocessing request is currently being executed by the advanced processing execution module 140. In the case of current execution of the requested preprocessing (step S900: yes), the preprocessing management routine executes the processing of steps S902 and S904. In the case of no current execution of the requested preprocessing (step S900: no), on the other hand, the preprocessing management routine goes to the decision of step S910.

At step S902, the advanced processing manager 130 waits for completion of the currently executed preprocessing and then sends a notification of completion of the required preprocessing to the image processing manager 160. At step S904, the advanced processing manager 130 resets the storage of the advanced preprocessing request buffer and terminates all the advanced preprocessing. The preprocessing management routine then goes back to step S810 to repeat the decisions of steps S810 to S870.

It is determined at step S910 whether the advanced preprocessing request buffer has any unprocessed advanced preprocessing request. In the case of storage of any unprocessed advanced preprocessing request (step S910: yes), the preprocessing management routine executes the processing of step S912 and then goes to step S920. In the case of storage of no unprocessed advanced preprocessing request (step S910: no), on the other hand, the preprocessing management routine immediately goes to step S920.

At step S912, the advanced processing manager 130 resets the storage of the advanced preprocessing request buffer and terminates all the advanced preprocessing.

At step S920, the advanced processing manager 130 requests the advanced processing execution module 140 to implement the preprocessing, in response to the preprocessing request received at step S810.

At step S930, the advanced processing manager 130 waits until reception of a notification of completion of the preprocessing from the advanced processing execution module 140. On reception of the notification of completion of the preprocessing, the advanced processing manager 130 notifies the image processing manager 160 of completion of the requested preprocessing at step S940. The preprocessing management routine then goes back to step S810 to repeat the decisions of steps S810 to S870.

As described above, the advanced processing manager 130 manages both the advanced preprocessing before start of a printing operation and the preprocessing after start of the printing operation. The advanced processing execution module 140 performs the required preprocessing under management of the advanced processing manager 130. The advanced preprocessing before start of the printing operation is executed in the course of preview display of the specified candidate print image.

B-4. Concrete Example of Advanced Implementation of Preprocessing

Figure 13:
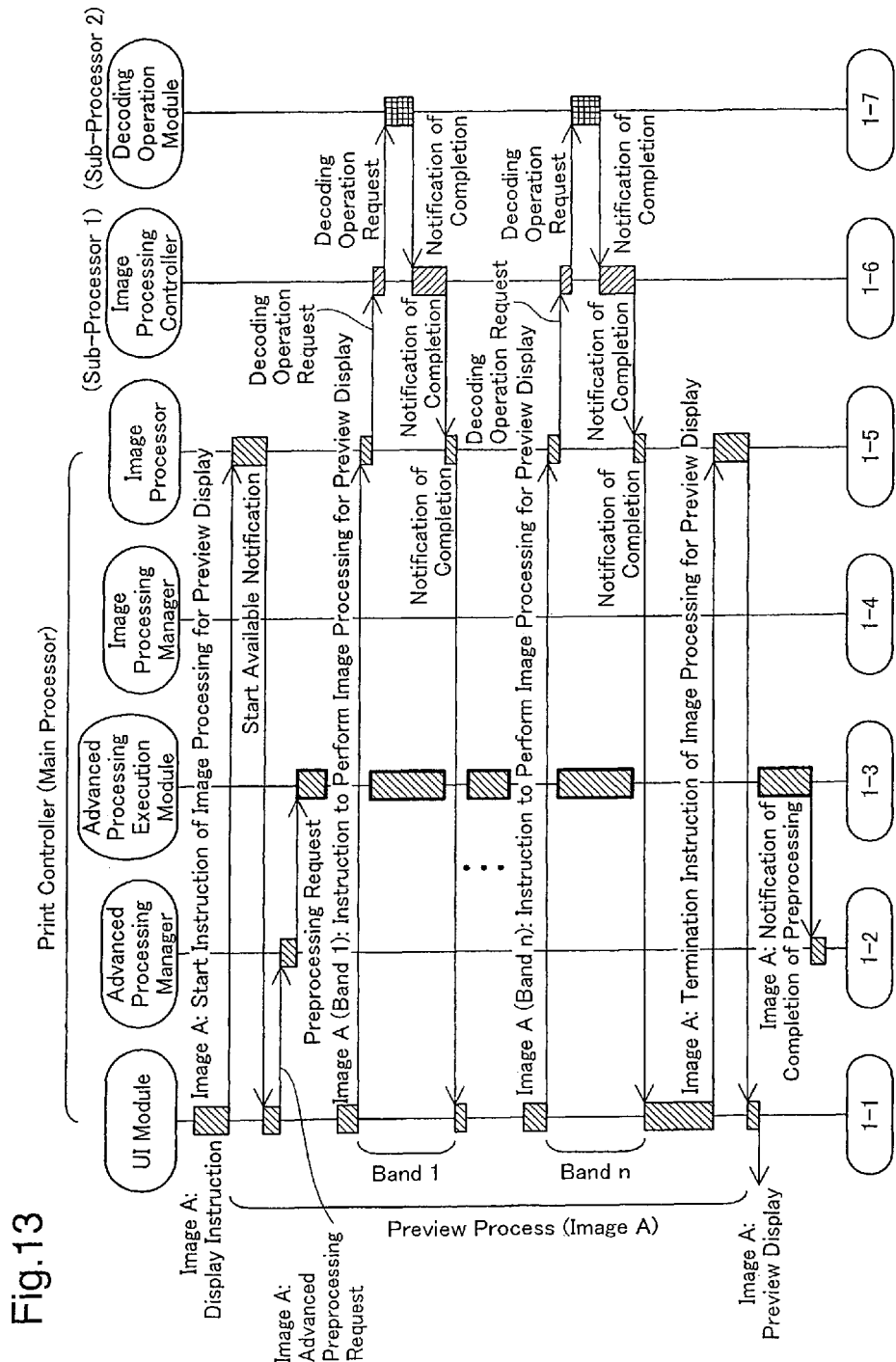
FIG. 13 shows a concrete example of advanced implementation of preprocessing.
Figure 14:
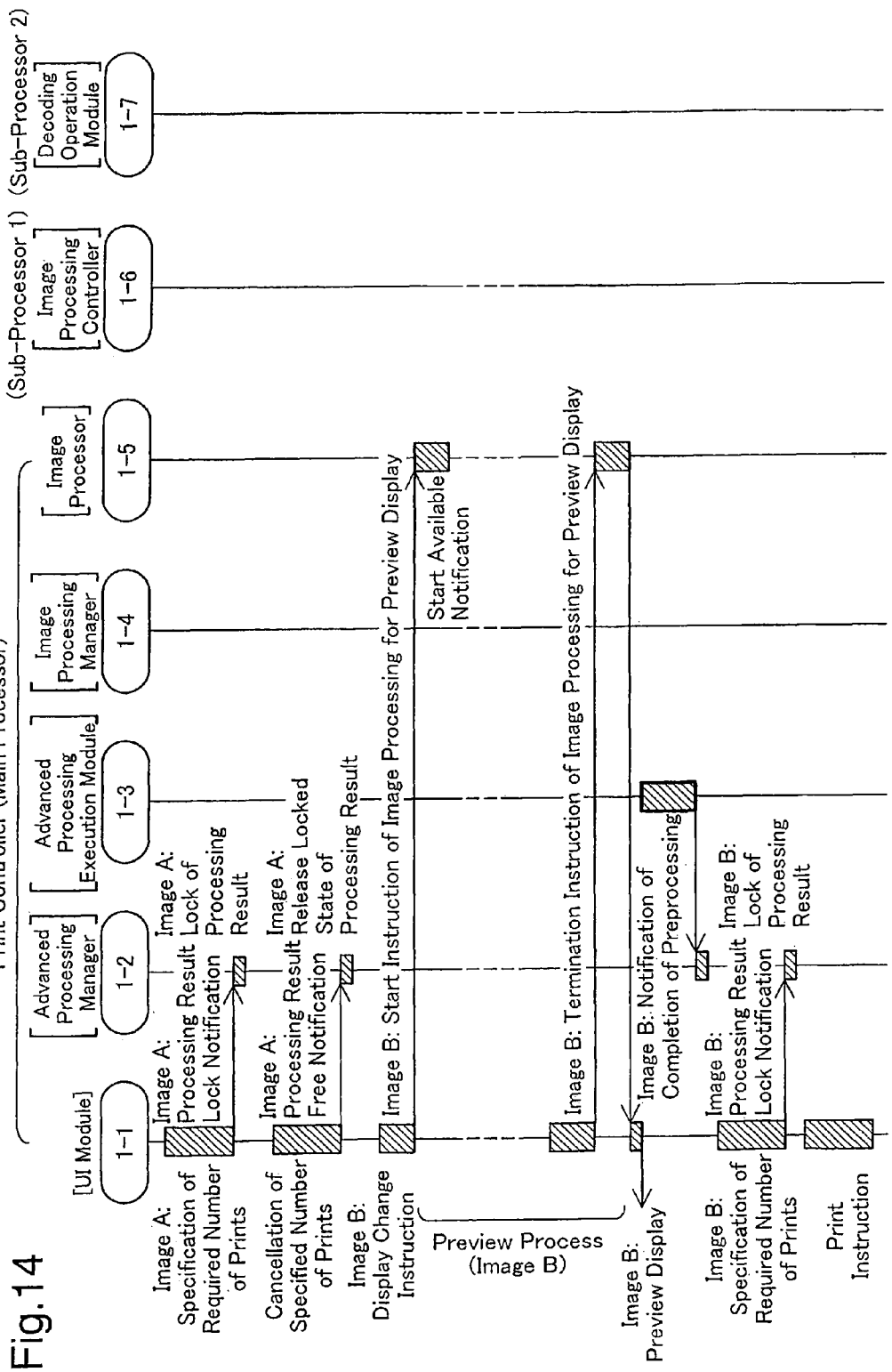
FIG. 14 shows the concrete example of advanced implementation of preprocessing.

FIGS. 13 and 14 show a concrete example of advanced implementation of preprocessing. This illustrated example preview-displays an image A as a candidate print image, selects the preview-displayed image A as a print object image, cancels the selection of the print object image, changes the preview display to an image B, selects the preview-displayed image B as a new print object image, and starts printing of the selected print object image.

When the user operates the selection buttons 506P and 506N (see FIG. 2) to give a command for preview display of a selected image A, the UI module 120 gives an instruction to the image processor 170 to start a required series of image processing for preview display of the selected image A.

When the image processor 170 is currently available for a start of the required image processing, the image processor 170 sends a start available notification to the UI module 120.

The UI module 120 receives the start available notification and sends the advanced processing manager 130 a request for advanced implementation of preprocessing with regard to the selected image A as a candidate print image.

The advanced processing manager 130 receives the request for advanced implementation of preprocessing gives a preprocessing instruction for performing the preprocessing of the image A to the advanced processing execution module 140.

The advanced processing execution module 140 starts the preprocessing in response to reception of the preprocessing instruction. In this embodiment, the preprocessing performed here includes the process of sampling decoded image data to create a histogram, the statistical process to determine the characteristic amounts of the image, for example, the maximum luminance, the minimum luminance, the average luminance, and the median luminance, based on the created histogram, the face recognition process, and the red-eye reduction process.

The advanced processing execution module 140 performing the preprocessing is included in the main processor 100 (see FIG. 1) having other multiple functional blocks. In general, the user interface-related processing has the priority. The preprocessing performed by the advanced processing execution module 140 accordingly has the lower priority than the other series of processing performed by the other functional blocks. As shown by the thick solid frames in FIG. 13, the advanced processing execution module 140 performs the preprocessing in the vacant time when the other functional blocks stop operations.

After sending the request for advanced implementation of preprocessing, the UI module 120 starts the preview process. The preview process divides the selected image A into 'n' bands (where n is an integer of not less than 1) and performs the required image processing for each of the 'n' bands for preview display.

According to the concrete procedure, the UI module 120 first sends an image processing request to the image processor 170 to perform the required image processing for preview display with regard to a band 1 of the selected image A. The image processor 170 receives the image processing request and sends a decoding operation request via the image processing controller 200A to the decoding operation module 200B to perform the decoding operation. The decoding operation module 200B receives the decoding operation request and performs the decoding operation for the band 1 of the selected image A. On completion of the decoding operation, the decoding operation module 200B sends a notification of completion of the decoding operation to the image processor 170 via the image processing controller 200A. The image processor 170 receives the notification of completion of the decoding operation and notifies the UI module 120 of completion of the required image processing for preview display with regard to the band 1 of the selected image A.

The required image processing for preview display described above with regard to the band 1 of the selected image A is repeated until completion of the image processing for the band 'n' of the selected image A.

The UI module 120 then sends an image processing termination instruction to the image processor 170 to conclude the image processing for preview display with regard to all the bands 'n' of the selected image A. On reception of a response to the image processing termination instruction from the image processor 170, the UI module 120 terminates the preview process of the image A and preview-displays the processed image A.

On completion of preprocessing with regard to the image A performed in the vacant time of the main processor 100, the advanced processing execution module 140 sends the advanced processing manager 130 a completion notification of preprocessing with regard to the image A. The advanced processing manager 130 receives the completion notification of preprocessing and changes the status of the processing completion information to 'completed' in the management area allocated to the image A in the preprocessing management list.

When the user operates the page number setting buttons 508U and 508D to set 1 or a larger number to the required number of prints with regard to the preview-displayed image A, the UI module 120 specifies the image A as a print object image and sends a processing result lock notification to the advanced processing manager 130 to lock the result of advanced preprocessing with regard to the image A. The image processing manager 130 receives the processing result lock notification and changes the status of the processing result lock information to 'locked' in the management area allocated to the image A in the preprocessing management list to lock the result of advanced preprocessing.

When the user operates the page number setting buttons 508U and 508D to return the set number of prints with regard to the image A to 0, the UI module 120 cancels out the selection of the image A as the print object image and sends a processing result free notification to the advanced processing manager 130 to release the locked state of the result of advanced preprocessing. Upon reception of the processing result free notification, the advanced processing manager 130 cancels the 'locked' state of the processing result lock information in the management area allocated to the image A in the preprocessing management list and deletes the information in this management area. This management area is then set in 'freed state' to be assignable to another print object image.

When the user operates the selection buttons 506P and 506N to give a command for preview display of a next selected image B, the UI module 120 gives an instruction to the image processor 170 to start a required series of image processing for preview display of the selected image B. The advanced preprocessing and the preview process are then performed according to the procedure described above with regard to the image A.

When the user operates the page number setting buttons 508U and 508D to set 1 or a larger number to the required number of prints with regard to the preview-displayed image B, the UI module 120 specifies the image B as a print object image and sends a processing result lock notification to the advanced processing manager 130 to lock the result of advanced preprocessing with regard to the image B. The image processing manager 130 receives the processing result lock notification and changes the status of the processing result lock information to 'locked' in the management area allocated to the image B in the preprocessing management list to lock the result of advanced preprocessing. The preprocessing result stored in the processing result storage area managed by the corresponding management area in the 'locked' state is utilized for the actual printing operation.

When the user operates the print start button 510 to give a print start command, the UI module 120 sends a print instruction to the card print controller 150 to start printing with regard to the image B specified as the print object image. The card print controller 150 receives the print instruction from the UI module 120 and controls the image processing performed by the image processor 170 under management of the image processing manager 160, the generation of print image data by the print image processor 180, and the printing operation by the print processor 190 to print the image B specified as the print object image.

D-5. Effects of Embodiment

As described above, the print control apparatus 10 of the second embodiment starts preprocessing in advance for preview display of a photo image represented by photo image data stored in the memory card 52. This arrangement desirably shortens the time period elapsed before start of required image processing for printing and thereby shortens the wait time before start of the actual printing operation, compared with the conventional print control apparatus that performs preprocessing of a specified print object image after the user's print start command and subsequently executes required image processing for printing.

When there are plural unprocessed advanced preprocessing requests, the print control apparatus 10 of the embodiment performs the requested preprocessing not in the request order of advanced preprocessing by the user's selection of print object images on the selection window but in the preset order. The procedure of the embodiment executes the required image processing for preview display and the required image processing for printing in the alphabetical order of image file names searched in the initialization process. The order of advanced execution of preprocessing is identical with the printing order.

This arrangement ensures efficient preprocessing and desirably shortens the wait time even when the request order of advanced implementation of preprocessing is different from the actual printing order.

Figure 15:
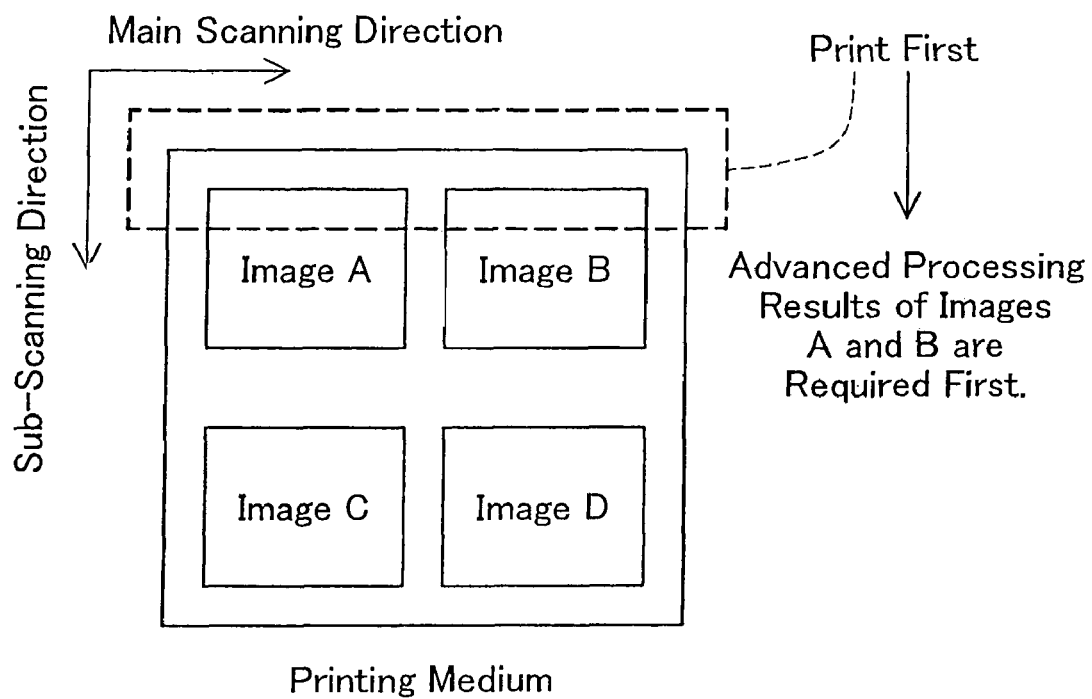
FIG. 15 shows a multi-image layout.

For example, in the case of printing a multi-image layout, results of advanced preprocessing with regard to images A and B are required first as shown in FIG. 15. Here it is assumed that the user selects print object images in the order of image C, image D, image B, and image A. Execution of preprocessing in this image selection order does not attain the expected effects of advanced preprocessing. The procedure of the embodiment implements advanced preprocessing in response to unprocessed advanced preprocessing requests not in the image selection order but in the order of actual printing operations. This effect of the embodiment is especially prominent for printing the multi-image layout.

The execution order of advanced preprocessing is not restricted to the actual printing order described in the embodiment but may be the order of the user's selection of print object images on the selection window.

In the structure of the embodiment, the actual image processing operations are performed not by the main processor 100 but by the three sub-processors 200A through 200C. This arrangement enables the high-speed processing and allows the effective use of the vacant time for execution of the preprocessing in the main processor 100, thus desirably shortening the total processing time.

C. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

In the first embodiment described above, the processing completion wait flag is set according to the decision result whether the processing amount of the sampling process (sampling process amount) has reached or exceeded ½ of the whole processing load. The decision criterion of the sampling process amount is, however, not restricted to this value '½' but may be set adequately based on the time required for preprocessing by the image processor 170 and the time required for preprocessing by the advanced processing execution module 140. Namely the decision criterion of the sampling process amount is set to a value that more effectively shortens the time elapsed before start of the main processing by waiting completion of advanced processing performed by the advanced processing execution module 140 than by stopping the advanced processing and making the image processor 170 newly start preprocessing.

The processing completion wait flag may be set according to the processing amount of decoding operation or according to the processing amount or the processing time of the statistical process, the face recognition process, or the red-eye analysis process included in the correction parameter specification process, instead of the sampling process amount.

In the print control apparatus 10 of the first or the second embodiment described above, each of the image processing controller 200A, the decoding operation module 200B, the image correction module 200C, and the print image processing execution module 200D is actualized by execution of a processor software program by a processor unit including a CPU, a memory, a bus controller, and other peripheral circuits. These functional blocks may alternatively be actualized by the hardware configuration.

In the print control apparatus 10 of the first or the second embodiment described above, when the user operates the selection buttons 506P and 506N (see FIG. 2) to select a preview-displayed photo image in the selection window as the candidate print image, preprocessing of the selected photo image is performed in advance. The technique of the present invention is, however, not restricted to this arrangement. In one possible modification, when the user operates the page number setting buttons 508U and 508D to set the required number of prints with regard to a preview-displayed photo image in the selection window, the photo image is selected as the candidate print image and preprocessing of the selected photo image is performed in advance.

Finally the present application claims the priority based on Japanese Patent Applications No. 2006-242714 filed on Sep. 7, 2006 and No. 2006-243616 filed on Sep. 8, 2006, which are herein incorporated by reference.

What is claimed is:

1. A print control apparatus that performs preprocessing and image processing with regard to a print object image specified as a target of a print start command, the print control apparatus comprising:
   an advanced processing execution module that performs a preprocessing prior to input of a print instruction for a start of printing, the preprocessing specifies a correction parameter used for correcting picture quality of the print object image; and
   an image processor that executes an image processing in response to the print instruction, the image processing includes a correction process of print object image data representing the print object image based on the correction parameter specified in the preprocessing and is required for printing the print object image;
   wherein, at a timing when the preprocessing is currently being performed by the advanced processing execution module, and at an input timing of an image processing instruction in response to the print instruction,
   the image processor, on condition that a processing amount of the preprocessing has reached a predetermined level, waits for completion of the preprocessing and implements the correction process by utilizing a result of the preprocessing, and
   the image processor, on condition that the processing amount has not yet reached the predetermined level, stops the preprocessing performs the preprocessing at a higher speed than a processing speed by the advanced processing execution module, and utilizes a result of the preprocessing to implement the correction process.

2. The print control apparatus in accordance with claim 1, the print control apparatus further having:
   a print object image specification module that selects a candidate print image as a possible option for the print object image and specifies the selected candidate print image as the print object image; and
   an advanced processing manager that manages the preprocessing performed by the advanced processing execution module,
   wherein in response to selection of the candidate print image, the advanced processing manager sets the selected candidate print image to a preprocessing target image as an object of the preprocessing, prior to specification of the candidate print image as the print object image, and sends an instruction to the advanced processing execution module for advanced implementation of the preprocessing with regard to the set preprocessing target image,
   when the candidate print image set as the preprocessing target image is specified as the print object image, the advanced processing manager sets a result of the preprocessing executed in advance to a result of the preprocessing with regard to the print object image.

3. The print control apparatus in accordance with claim 2, wherein the print object image specification module selects either a preview-displayed image or an image with setting of a required number of prints as the candidate print image.

4. The print control apparatus in accordance with claim 2, wherein the correction parameter includes at least one parameter selected from a first parameter group obtained by a statistical process of the print object image data representing the specified print object image, a second parameter group obtained by a face recognition process of the print object image data, and a third parameter group obtained by a red-eye reduction process of the print object image data.

5. The print control apparatus in accordance with claim 1, wherein when preprocessing with regard to another image other than the print object image specified as an object of image processing is currently being performed by the advanced processing execution module at the input timing of the image processing instruction in response to the print instruction, the image processor stops the preprocessing currently performed by the advanced processing execution module, performs the preprocessing with regard to the print object image as the object of image processing at the higher speed than the processing speed by the advanced processing execution module, and utilizes the result of the preprocessing to implement the correction process.

6. A print control method that performs preprocessing and image processing with regard to a print object image specified as a target of a print start command, where the preprocessing specifies a correction parameter used for correcting picture quality of the print object image, and the image processing includes a correction process of print object image data representing the print object image based on the correction parameter specified in the preprocessing and is required for printing the print object image, the print control method comprising:
   an advanced processing step of performing the preprocessing in advance prior to input of a print instruction for a start of printing; and
   an image processing step of executing the image processing in response to the print instruction,
   wherein, at a timing when preprocessing with regard to the print object image specified as an object of image processing is currently being performed in the advanced processing step, and at an input timing of an image processing instruction in response to the print instruction,
   the image processing step, on condition that a processing amount of the preprocessing currently performed in the advanced processing step has reached a predetermined level, comprises waiting for completion of the preprocessing performed in the advanced processing execution step and implementing the correction process by utilizing a result of the preprocessing performed in the advanced processing execution step,
   the image processing step, on condition that the processing amount of the preprocessing currently performed in the advanced processing execution step has not yet reached the predetermined level, comprises stopping the preprocessing currently performed in the advanced processing execution step, performing the preprocessing with regard to the print object image as the object of image processing at a higher speed than a processing speed in the advanced processing execution step, and utilizing a result of the preprocessing to implement the correction process.

7. The print control method in accordance with claim 6, the print control method further having:

a print object image specification step of selecting a candidate print image as a possible option for the print object image and specifying the selected candidate print image as the print object image, wherein in response to selection of the candidate print image, the advanced processing step sets the selected candidate print image to a preprocessing target image as an object of the preprocessing, prior to specification of the candidate print image as the print object image, and performs the preprocessing in advance with regard to the set preprocessing target image, when the candidate print image set as the preprocessing target image is specified as the print object image, the advanced processing step sets a result of the preprocessing executed in advance to a result of the preprocessing with regard to the print object image.

* * * * *